(12) United States Patent
Kitamura et al.

(10) Patent No.: US 10,324,456 B2
(45) Date of Patent: Jun. 18, 2019

(54) PLANT OPERATION SUPPORT SYSTEM WITH MANAGEMENT OF ASSIGNED RESOURCES USING PREDICTIONS OF RESOURCE DEFICIENCY

(71) Applicant: Mitsubishi Electric Corporation, Chiyoda-ku, Tokyo (JP)

(72) Inventors: Shingo Kitamura, Tokyo (JP); Kenta Fukami, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 165 days.

(21) Appl. No.: 15/444,452

(22) Filed: Feb. 28, 2017

(65) Prior Publication Data

US 2018/0024543 A1    Jan. 25, 2018

(30) Foreign Application Priority Data

Jul. 25, 2016 (JP) ................................. 2016-145182

(51) Int. Cl.

| | |
|---|---|
| *G05B 19/418* | (2006.01) |
| *G06Q 10/06* | (2012.01) |
| *G06Q 50/04* | (2012.01) |

(52) U.S. Cl.
CPC ....... *G05B 19/41865* (2013.01); *G06Q 10/06* (2013.01); *G06Q 10/0631* (2013.01);
(Continued)

(58) Field of Classification Search
CPC ................ G05B 19/41865; G05B 2219/43112
(Continued)

(56) References Cited

U.S. PATENT DOCUMENTS

| | | | |
|---|---|---|---|
| 8,875,150 B2* | 10/2014 | Ferdous | G06F 11/3442 709/224 |
| 2007/0150325 A1* | 6/2007 | Bjornson | G06Q 10/06 705/7.37 |

(Continued)

FOREIGN PATENT DOCUMENTS

| | | |
|---|---|---|
| JP | 06-090295 A | 3/1994 |
| JP | 2000-155778 A | 6/2000 |

(Continued)

*Primary Examiner* — Chun Cao
(74) *Attorney, Agent, or Firm* — Buchanan Ingersoll & Rooney PC

(57) ABSTRACT

An object of this invention is to provide a plant operation support-system server and a plant operation support system which can manage the current situation of overall resources that are required for performing jobs corresponding to a procedure manual, and can further achieve resource management with enough margin based on future prediction. Using a current procedure-manual location determination unit, a control unit of a plant operation support-system server determines a current location in procedure-manual data $D_M$, based on a condition of the plant acquired through sensors by a plant data acquisition unit. When there is a change in the current location, the control unit causes a current-situation management determination unit to assign currently-required resources according to the current position and causes a predictive management determination unit to predict presence/absence of resource deficiency.

14 Claims, 27 Drawing Sheets

(52) U.S. Cl.
CPC .... *G06Q 50/04* (2013.01); *G05B 2219/43112* (2013.01); *Y02P 90/18* (2015.11); *Y02P 90/30* (2015.11)

(58) Field of Classification Search
USPC .......................................................... 700/44
See application file for complete search history.

(56) References Cited

U.S. PATENT DOCUMENTS

| | | | | |
|---|---|---|---|---|
| 2010/0153960 | A1* | 6/2010 | Youn | G06F 9/5061 718/104 |
| 2012/0159367 | A1* | 6/2012 | Calcaterra | G06F 9/5011 715/771 |
| 2014/0122143 | A1* | 5/2014 | Fletcher | G06Q 10/0631 705/7.14 |

FOREIGN PATENT DOCUMENTS

| | | |
|---|---|---|
| JP | 2003-030770 A | 1/2003 |
| JP | 2008-046808 A | 2/2008 |
| JP | 2013-097644 A | 5/2013 |

* cited by examiner

| Scenario | Job | Job Name | Standard Time Period of Job |
|---|---|---|---|
| Water Injection into Steam Generator | 1 | Installation of Diesel-Driven Injection Pump | 300 |
| | 2 | Water Injection into Steam Generator | 600 |

FIG. 4

| Scenario | Job | Resource Type for Use | Required Number/Amount |
|---|---|---|---|
| Water Injection into Steam Generator | 1 | Diesel-Driven Injection Pump P | 1 |
| | 1 | Hose R | 2 |
| | 1 | Worker S | 10 |
| | 2 | Diesel-Driven Injection Pump P | 1 |
| | 2 | Hose R | 3 |
| | 2 | Diesel Oil T | 500 L |
| | 2 | Worker U | 2 |

FIG. 5

| Resource Type | Resource Name | Location | Assigned Job | Assignment Status | Elapsed Time | Operable Time |
|---|---|---|---|---|---|---|
| Diesel-Driven Injection Pump P | Diesel-Driven Injection Pump P1 | North of Plant | 1 | In-Use | 160 min. | 600 min. |
| | | Compartment | 2 | Planned for Use | 0 | |
| Hose R | Special-Purpose Hose R1 | North of Plant | 1 | In-Use | 0 | |
| | | Compartment | 2 | Planned for Use | 0 | |
| | General-Purpose Hose R2 | North of Plant | 1 | In-Use | 0 | |
| | | Compartment | 2 | Planned for Use | 0 | |
| | General-Purpose Hose R3 | South of Plant Compartment | — | — | — | |

FIG. 6

| No. | General Items | Reserved | In-Use | Next Required Number |
|---|---|---|---|---|
| 1 | Responsible Person (Number) | 30 | 17 | 14 ! |
| 2 | Vehicle (Number) | 3 | 1 | 1 |
| 3 | Tool A (Number) | 10 | 5 | 3 |
| 4 | Tool B (Number) | 3 ! | 3 | 1 |

| No. | Detailed Items | Elapsed Time | Remaining Time | Next Required Time |
|---|---|---|---|---|
| 1 | Mr./Ms. A | 360 min. | 120 min. | 60 min. |
| 2 | Mr./Ms. B | 10 min. | 470 min. | 180 min. |
| 3 | Apparatus C | 180 min. | 17 min. ! | – |
| 4 | Apparatus D | 180 min. | 60 min. | 80 min. ! |

FIG. 9

| No. | General Items | In-Use/Reserved (Job 1) | After Completion of Job 1 | After Completion of Job 2 | After Completion of Job 3 |
|---|---|---|---|---|---|
| 1 | Responsible Person (Number) | 17 /30 | 31 ! /30 | 40 ! /30 | 50 ! /30 |
| 2 | Vehicle (Number) | 1 / 3 | 2 / 3 | 1 / 3 | 3 / 3 |
| 3 | Tool A (number) | 5 /10 | 8 /10 | 9 /10 | 12 ! /10 |
| 4 | Tool B (number) | 3 / 3 ! | 4 ! / 3 | 5 ! / 3 | 6 ! / 3 |

| No. | Detailed Items | Consumed/Reserved Amount (At Start Time of Job 1) | After Completion of Job 1 | After Completion of Job 2 | After Completion of Job 3 |
|---|---|---|---|---|---|
| 1 | Mr./Ms A (min.) | 360 / 480 | 420 / 480 | 60 / 60 | — |
| 2 | Mr./Ms B (min.) | 10 / 480 | 190 / 480 | 120 /290 | 120 /170 |
| 3 | Apparatus C (min.) | 180 / 197 | 180 / 197 | — | — |
| 4 | Apparatus D (min.) | 180 / 240 | 260 ! / 240 | 120 ! / 0 | 120 ! / 0 |
| 5 | Apparatus E (min.) | 100 / 500 | 200 / 500 | 100 /300 | 100 /200 |
| 6 | Fuel F (L) | 300 /1000 | 400 /1000 | 400 /600 | 400 ! /200 |

FIG. 11

| Job | Job Name | Status | Starting Date and Time | Completion Date and Time | Assigned Item | Deficient Item |
|---|---|---|---|---|---|---|
| 1 | Installation of Diesel-Driven Injection Pump | Working Now | 2015/4/1 9:00 | 4/1 14:00 (Planned) | Diesel-Driven Injection Pump P: 1<br>Hose R: 2<br>Responsible Person S: 10 | None |
| 2 | Water Injection into Steam Generator | Not Yet | 4/1 14:00 (Planned) | 4/2 0:00 (Planned) | Diesel-Driven Injection Pump P: 1<br>Hose R: 2<br>Diesel Oil T: 500L<br>Responsible Person U: 10 | None |
| 3 | Water Injection into Steam Generator (Continued 1) | Not Yet | 4/2 0:00 (Planned) | 4/2 10:00 (Planned) | Diesel-Driven Injection Pump P: 1<br>Hose R: 2<br>Diesel Oil T: 300L<br>Responsible Person U: 10 | Usable Time of Diesel-Driven injection Pump P: 360 minutes deficient<br>Diesel Oil T :200L deficient |

| Scenario | Job Name | Resource Type for Use | Resource Name for Use | Priority |
|---|---|---|---|---|
| Water Injection into Steam | Installation of Diesel-Driven | Hose R | Special-Purpose Hose R1 | 1 |
| | | | General-Purpose Hose R2 | 2 |
| | | | General-Purpose Hose R3 | 3 |

FIG. 21B

| Resource Name | Name of Objective Resource | Priority |
|---|---|---|
| Diesel-Driven Injection Pump P1 | Special-Purpose Hose R1 | 1 |
| | General-Purpose Hose R2 | 2 |
| | General-Purpose Hose R3 | 3 |

FIG. 21C

| Resource Type | Resource Name | Priority |
|---|---|---|
| Hose R | General-Purpose High-Performance Hose R4 | 1 |
| | General-Purpose Ordinary-Performance Hose R5 | 2 |

| Resource Type | Resource Name | Location | Location Priority | Reserved Amount (Before Start of Job) | Assigned Amount | Estimated Remaining Amount (After Completion of Job) | Currently-Usable Amount (Remaining Amount) | Status | Assigned Job | Assignment Destination target |
|---|---|---|---|---|---|---|---|---|---|---|
| Fuel F | Fuel F | Tank in Apparatus C | 1 | 100 | 100 | 0 | 40 | In-Use | Job 1 | Apparatus C |
| | Fuel F | Tank in Apparatus C | 1 | 50 | – | – | 50 | Location Only Assigned | – | Apparatus C |
| | Fuel F | Tank in Apparatus D | 1 | 100 | 100 | 20 | 40 | In-Use | Job 1 | Apparatus D |
| | Fuel F | Tank in Apparatus D | 1 | 100 | 100 | 0 | 100 | Assigned | Job 2 | Apparatus D |
| | Fuel F | Tank in Apparatus E | 1 | 200 | 200 | 0 | 40 | In-Use | Job 1 | Apparatus E |
| | Fuel F | Tank in Apparatus E | 1 | 100 | 100 | 0 | 200 | Assigned | Job 2 | Apparatus E |
| | Fuel F | Inside of Building of Facility #1 | 2 | 100 | 100 | 0 | 100 | Assigned | Job 2 | Apparatus E |
| | Fuel F | Inside of Building of Facility #1 | 2 | 100 | 100 | 0 | 100 | Assigned | Job 3 | Apparatus E |
| | Fuel F | Storage 1 in the Yard | 3 | 100 | 100 | 0 | 100 | Assigned | Job 3 | Apparatus E |
| | Fuel F | Storage 2 in the Yard | 3 | 100 | 100 | 0 | 100 | Assigned | Job 3 | Apparatus E |
| | Fuel F | Storage 1 outside the Yard | 4 | 1000 | – | – | 1000 | Not Yet Assigned | – | – |

FIG. 22

| | Location | Location Priority | Reserved Amount (Before Start of Job) | Assigned Amount | Estimated Remaining Amount (After Completion of Job) | Currently-Usable Amount (Remaining Amount) | Status | Assigned Job | Assignment Destination target |
|---|---|---|---|---|---|---|---|---|---|
| Apparatus C | Facility #1 | 1 | 197 | 180 | 17 | 17 | In-Use | Job 1 | Facility #1 |
| Apparatus C | Facility #1 | 1 | 17 | – | – | 17 | Not Yet Assigned | – | – |
| Apparatus D | Facility #1 | 1 | 240 | 240 | 0 | 60 | In-Use | Job 1 | Facility #1 |
| Apparatus E | Inside of Building of Facility #1 | 1 | 200 | 200 | 0 | 100 | Assigned | Job 1 | Facility #1 |
| Apparatus E | Inside of Building of Facility #1 | 1 | 100 | 100 | | 100 | Assigned | Job 2 | Facility #1 |
| Apparatus E | Inside of Building of Facility #1 | 1 | 100 | 100 | | 100 | Assigned | Job 3 | Facility #1 |
| Apparatus E | Inside of Building of Facility #1 | 1 | 100 | – | – | 100 | Not Yet Assigned | – | Facility #1 |

FIG. 23

Storage Location Priority: 3

| No. | General Items | In-Use/Reserved (Job 1) | Job 1 | Job 2 | Job 3 |
|---|---|---|---|---|---|
| 1 | Responsible Person (Number) | 17/30 | 31 ! /30 | 40 ! /30 | 50 ! /30 |
| 2 | Vehicle (Number) | 1 / 3 | 2 / 3 | 1 / 3 | 3 / 3 |
| 3 | Tool A (number) | 5/10 | 8 /10 | 9 /10 | 12 ! /10 |
| 4 | Tool B (number) | 3 / 3 ! | 4 ! / 3 | 5 ! / 3 | 6 ! / 3 |

| No. | Detailed Items | Progress/Reserved (Job 1) | Job 1 | Job 2 | Job 3 |
|---|---|---|---|---|---|
| 1 | Mr./Ms A (min.) | 360 / 480 | 420 / 480 | 60 / 60 | – |
| 2 | Mr./Ms B (min.) | 10 / 480 | 190 / 480 | 120 /290 | 120 /170 |
| 3 | Apparatus C (min.) | 180 / 197 | 180 / 197 | – | – |
| 4 | Apparatus D (min.) | 180 / 240 | 260 ! / 240 | 120 ! / 0 | 120 ! / 0 |
| 5 | Apparatus E (min.) | 100 / 500 | 200 / 500 | 100 /300 | 100 /200 |
| 6 | Fuel F (L) | 300 /1000(1) | 400 /1000(1,2) | 400 /600(2) | 400 /200(3) |

| No. | General Items | Job 1 | | Job2 | | Job 3 | | Job 4 | | Time |
|---|---|---|---|---|---|---|---|---|---|---|
| | | 1 | 2 | 3 | 4 | 5 | 6 | 7 | 8 | |
| 1 | Responsible Person (Number) | | | | | | | | | |
| 2 | Vehicle (Number) | | | | | | | | | |
| 3 | Tool A (number) | | | | | | | | | |
| 4 | Tool B (number) | | | | | | | | | |

| No. | Detailed Items | 1 | 2 | 3 | 4 | 5 | 6 | 7 | 8 |
|---|---|---|---|---|---|---|---|---|---|
| 1 | Mr./Ms A | | | | | | | | |
| 2 | Mr./Ms B | | | | | | | | |
| 3-1 | Apparatus C | | | | | | | | |
| 3-2 | [Apparatus C] Fuel F | | | | | | | | |
| 4-1 | Apparatus D | | | | | | | | |
| 4-2 | [Apparatus D] Fuel F | | | | | | | | |
| 5-1 | Apparatus E | | | | | | | | |
| 5-2 | [Apparatus E] Fuel F | | | | | | | | |
| 6 | Fuel F | | | | | | | | |

PLANT OPERATION SUPPORT SYSTEM WITH MANAGEMENT OF ASSIGNED RESOURCES USING PREDICTIONS OF RESOURCE DEFICIENCY

BACKGROUND OF THE INVENTION

1. Field of the Invention

The present invention relates to a plant operation support-system server and a plant operation support system, and in particular, to a plant operation support-system server and a plant operation support system for supporting a procedure manual-based operation.

2. Description of the Background Art

According to a conventional support apparatus for disaster-recovery-operation management, it supports work for assigning responsible persons to disaster recovery items to be applied at the time of disaster (see, for example, Patent Document 1).

Patent Document 1: Japanese Patent Application Laid-open No. 2000-155778 (paragraph 0013, FIG. 1).

However, according to the configuration of the support apparatus for disaster-recovery-operation management as described in Patent Document 1, it is necessary to separately assign resources other than staff members (human resources), such as pieces of equipment, instruments and the like that are required for performing a job. In addition, although the responsible persons are assigned to disaster recovery items that are just currently required, the number of staff members that will be required in the future is not predicted. Accordingly, there is a problem that deficiency of staff members is found just before execution of the job.

SUMMARY OF THE INVENTION

The present invention has been made to solve the problems as described above, and an object thereof is to provide a plant operation support-system server and a plant operation support system which can manage the current situation of overall resources (staff members, pieces of equipment, instruments, etc.) that are required for performing jobs corresponding to a procedure manual, and can further achieve resource management with enough margin based on future prediction.

A plant operation support-system server according to the invention is characterized by comprising: a plant data acquisition unit that acquires a condition of a plant; a procedure-manual data storage unit in which procedure-manual data is stored; a resource data storage unit in which resource data is stored; a current procedure-manual location determination unit that determines, from the procedure-manual data stored in the procedure-manual data storage unit, a current location in the procedure-manual data, according to the condition of the plant acquired by the plant data acquisition unit; a predictive procedure-manual location determination unit that predicts a job content that is expected to be executed next, from the procedure-manual data stored in the procedure-manual data storage unit and from the current location in the procedure-manual data determined by the current procedure-manual location determination unit; a required-resource determination unit that determines currently-required resources from the resource data stored in the resource data storage unit; a predictive required-resource determination unit that determines next-required resources, from the job content expected to be executed next that is predicted by the predictive procedure-manual location determination unit; a current-situation management determination unit that assigns to the plant, the currently-required resources determined by the required-resource determination unit; a predictive management determination unit that attempts to assign the next-required resources determined by the predictive required-resource determination unit, to thereby predict presence/absence of resource deficiency; and a control unit that causes the current-situation management determination unit to assign the currently-required resources and causes the predictive management determination unit to predict the presence/absence of resource deficiency, according to the current location in the procedure-manual data determined by the current procedure-manual location determination unit on the basis of the condition of the plant acquired by the plant data acquisition unit.

According to the invention, the plant operation support-system server determines the current location in the procedure-manual data on the basis of the condition of the plant acquired through a sensor, thereby to assign the currently-required resources and to predict presence/absence of resource deficiency, according to the current location. Thus, it is possible not only to manage the current situation of the resources required for performing jobs corresponding to the procedure manual, but also to achieve resource management with enough margin based on future prediction, so that the operability of the plant can be improved.

The foregoing and other objects, features, aspects and advantages of the present invention will become more apparent from the following detailed description when read in conjunction with the accompanying drawings.

BRIEF DESCRIPTION OF THE DRAWINGS

FIG. 4 is a diagram showing an example of resource data in the plant operation support-system server in the plant operation support system according to Embodiment 1 of the invention.

FIG. 5 is a diagram showing an example of resource data in the plant operation support-system server in the plant operation support system according to Embodiment 1 of the invention.

FIG. 6 is a diagram showing an example of resource data in the plant operation support-system server in the plant operation support system according to Embodiment 1 of the invention.

FIG. 9 is a diagram showing a display example by the plant operation support-system server in the plant operation support system according to Embodiment 1 of the invention.

FIG. 11 is a diagram showing another display example by the plant operation support-system server in the plant operation support system according to Embodiment 1 of the invention.

FIG. 14 is a diagram showing another display example by the plant operation support-system server in the plant operation support system according to Embodiment 1 of the invention.

FIGS. 21A, 21B and 21C are each a diagram showing an example of resource data in the plant operation support-system server in the plant operation support system according to Embodiment 5 of the invention.

FIG. 22 is a diagram showing an example of resource data in a plant operation support-system server in a plant operation support system according to Embodiment 6 of the invention.

FIG. 23 is a diagram showing another example of resource data in the plant operation support-system server in the plant operation support system according to Embodiment 6 of the invention.

FIG. 24 is a diagram showing a display example by the plant operation support-system server in the plant operation support system according to Embodiment 6 of the invention.

FIG. 25 is a diagram showing another display example by the plant operation support-system server in the plant operation support system according to Embodiment 6 of the invention.

DETAILED DESCRIPTION OF THE EMBODIMENTS OF THE INVENTION

Embodiment 1

Figure 1:
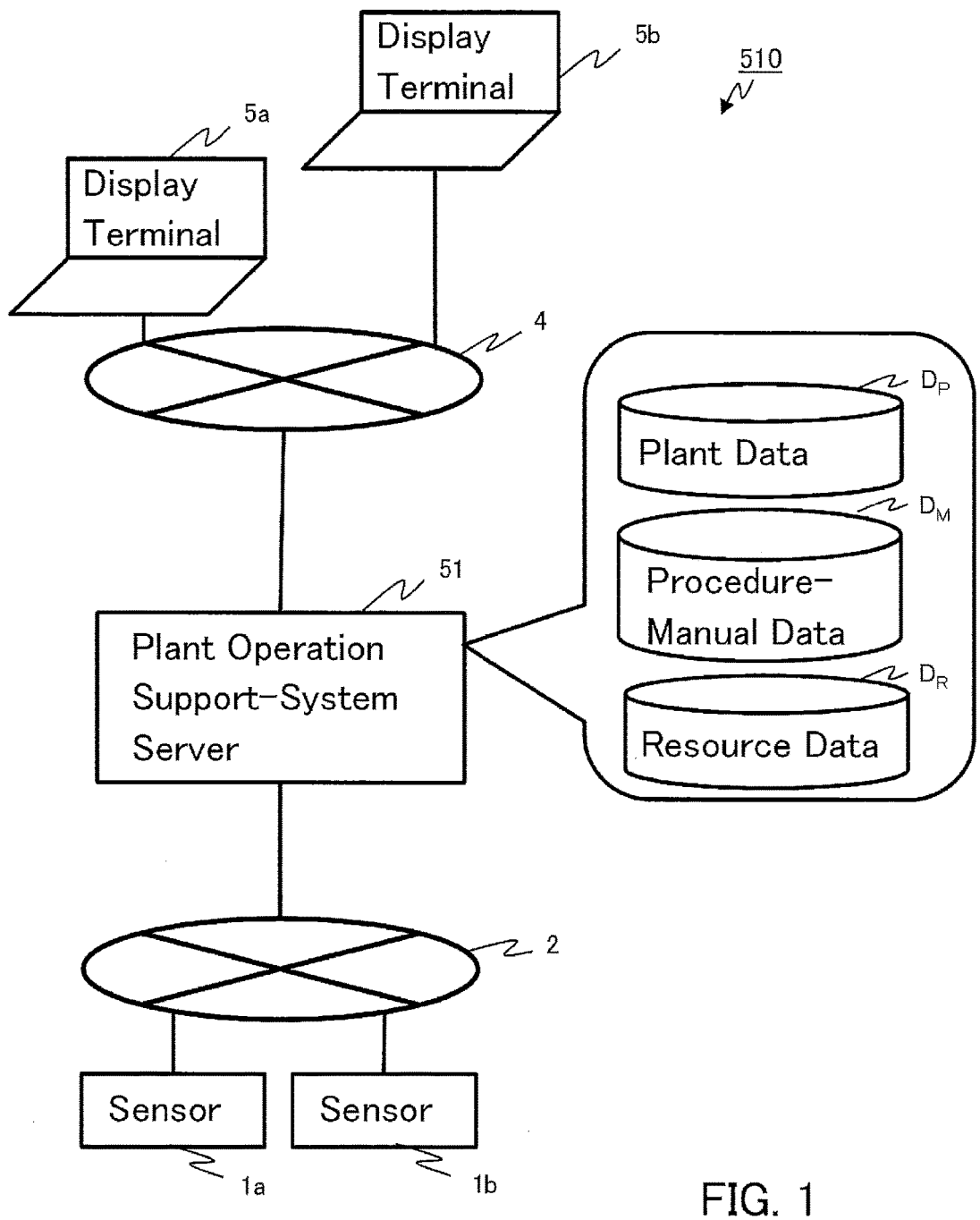
FIG. 1 is an overall configuration diagram of a plant operation support system according to Embodiment 1 of the invention.

FIG. 1 is an overall configuration diagram of a plant operation support system 510 according to Embodiment 1 of the invention. As shown in FIG. 1, the plant operation support system 510 is configured with sensors 1 (1a, 1b) for detecting a plant condition, a plant operation support-system server 51 connected to the sensors 1 through a plant network 2, and display terminals 5 (5a, 5b) serving as monitoring devices, connected to the plant operation support-system server 51 through a system network 4. In addition, a display terminal placed on another location may be connected to the plant operation support-system server 51 through a network.

Figure 2:
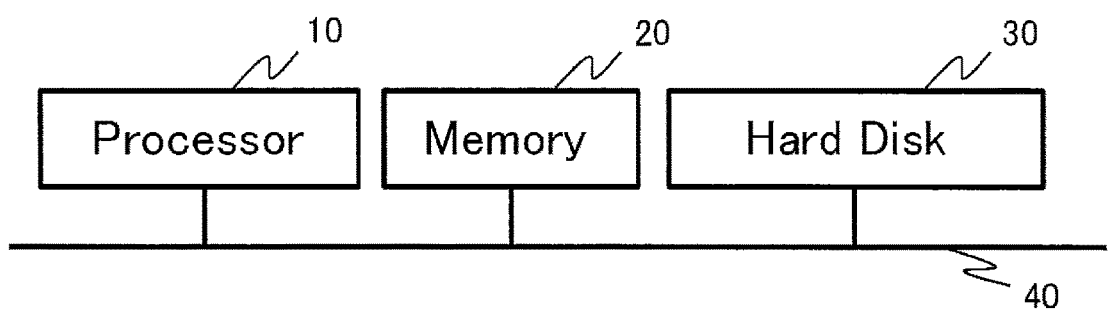
FIG. 2 is a configuration diagram of a plant operation support-system server in the plant operation support system according to Embodiment 1 of the invention.

FIG. 2 is a configuration diagram of the plant operation support-system server 51 that is a main part of the plant operation support system 510 according to Embodiment 1 of the invention. As shown in FIG. 2, the plant operation support-system server 51 comprises a computer which is configured with a processor 10, a memory 20, a hard disk 30 (auxiliary storage device, HDD: Hard Disk Drive), and a system bus 40 that connects them to each other.

Figure 3:
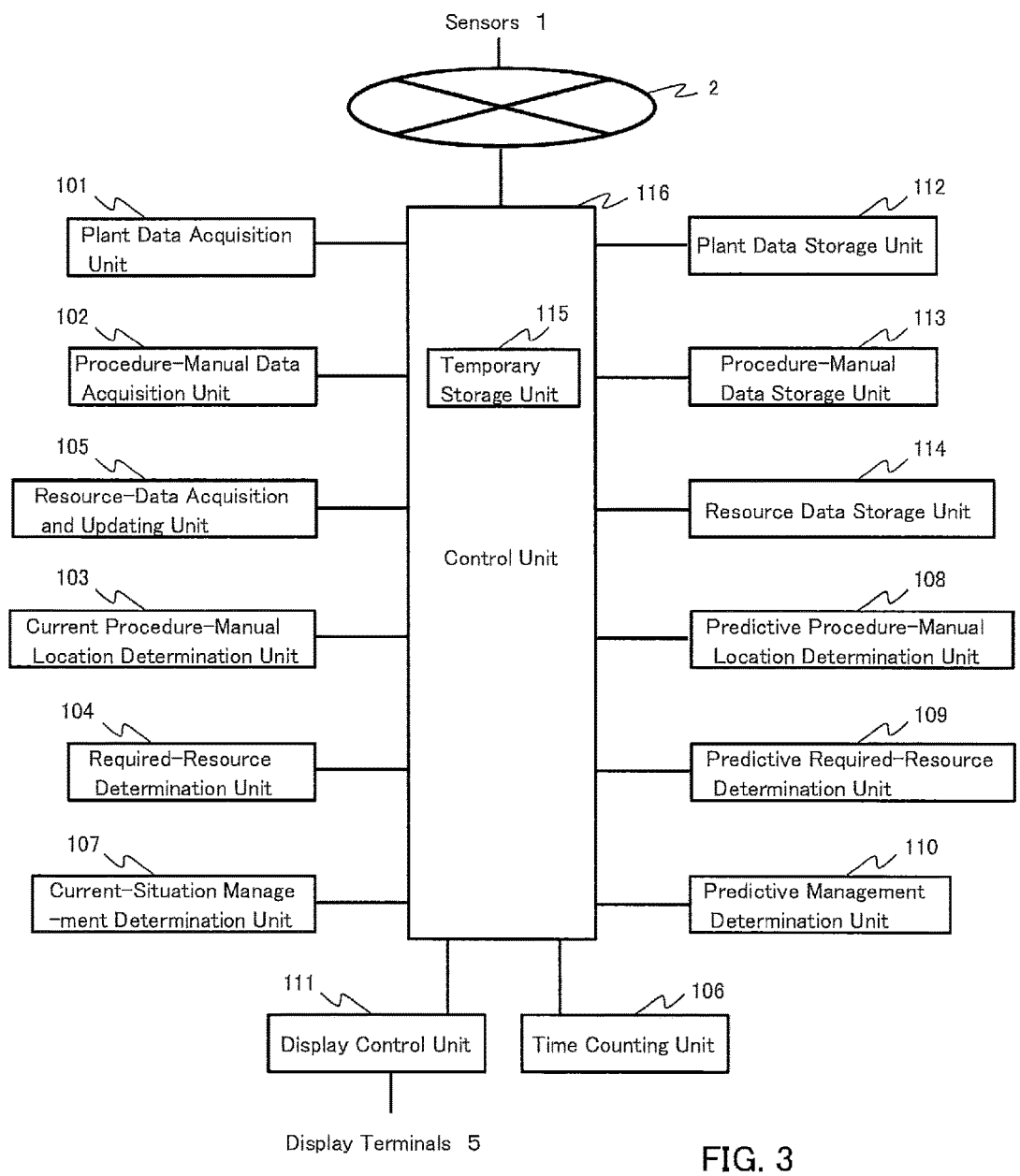
FIG. 3 is a functional block diagram of the plant operation support-system server in the plant operation support system according to Embodiment 1 of the invention.

FIG. 3 is a functional block diagram of the plant operation support-system server 51 that is a main part of the plant operation support system 510 according to Embodiment 1 of the invention. As shown in FIG. 3, the plant operation support-system server 51 comprises: a plant data acquisition unit 101; a procedure-manual data acquisition unit 102; a current procedure-manual location determination unit 103; a required-resource determination unit 104; a resource-data acquisition and updating unit 105; a time counting unit 106; a current-situation management determination unit 107; a predictive procedure-manual location determination unit 108; a predictive required-resource determination unit 109; a predictive management determination unit 110; a display control unit 111; a plant data storage unit 112; a procedure-manual data storage unit 113; a resource data storage unit 114; a temporary storage unit 115; and a control unit 116.

The respective functions of the plant data acquisition unit 101, the procedure-manual data acquisition unit 102, the current procedure-manual location determination unit 103, the required-resource determination unit 104, the resource-data acquisition and updating unit 105, the time counting unit 106, the current-situation management determination unit 107, the predictive procedure-manual location determination unit 108, the predictive required-resource determination unit 109, the predictive management determination unit 110, the display control unit 111 and the control unit 116, are implemented in such a manner that the processor 10 executes programs stored in the memory 20 serving as the temporary storage unit 115, using data stored in the hard disk 30 serving as the plant data storage unit 112, the procedure-manual data storage unit 113 and the resource data storage unit 114. Instead, the above functions may be implemented by multiple processors 10 and multiple memories 20 or multiple hard disks 30 in a cooperative manner.

The plant operation support-system server 51 stores plant data $D_P$, procedure-manual data $D_M$ and resource data $D_R$ in the plant data storage unit 112, the procedure-manual data storage unit 113 and the resource data storage unit 114, respectively. The plant data $D_P$ corresponds to a database in which data transmitted through the plant network 2 is stored at any time. The plant data acquisition unit 101 acquires necessary plant data from the plant data storage unit 112. The procedure-manual data $D_M$ corresponds to a database that is storing overall procedure-manual data, in which the data has been prestored before operation of the system. The procedure-manual data acquisition unit 102 acquires necessary information from the procedure-manual data storage unit 113. The resource data $D_R$ corresponds to a database in which overall resource-related information is stored, examples of which include data of stationary-equipment and the like that is to be prestored, and data of transportable-equipment and the like whose information is to be acquired as needed. The resource-data acquisition and updating unit 105 acquires necessary resource data from the resource data storage unit 114. An assignment-result database in which stored is an assignment result obtained when the resources are assigned by the current-situation management determination unit 107 or the predictive management determination unit 110 may be set as a part of the resource data $D_R$. A calculation-result database in which stored is a remaining time or a next required time calculated by the current-situation management determination unit 107 or the predictive management determination unit 110 from the elapsed time counted by the time counting unit 106 may be set as a part of the resource data $D_R$. In FIG. 4 and FIG. 5, examples of the procedure-manual data $D_M$ are shown. Shown in FIG. 4 is a scenario and in FIG. 5 are required resources. FIG. 6 shows an example of the resource data $D_R$.

Figure 7:
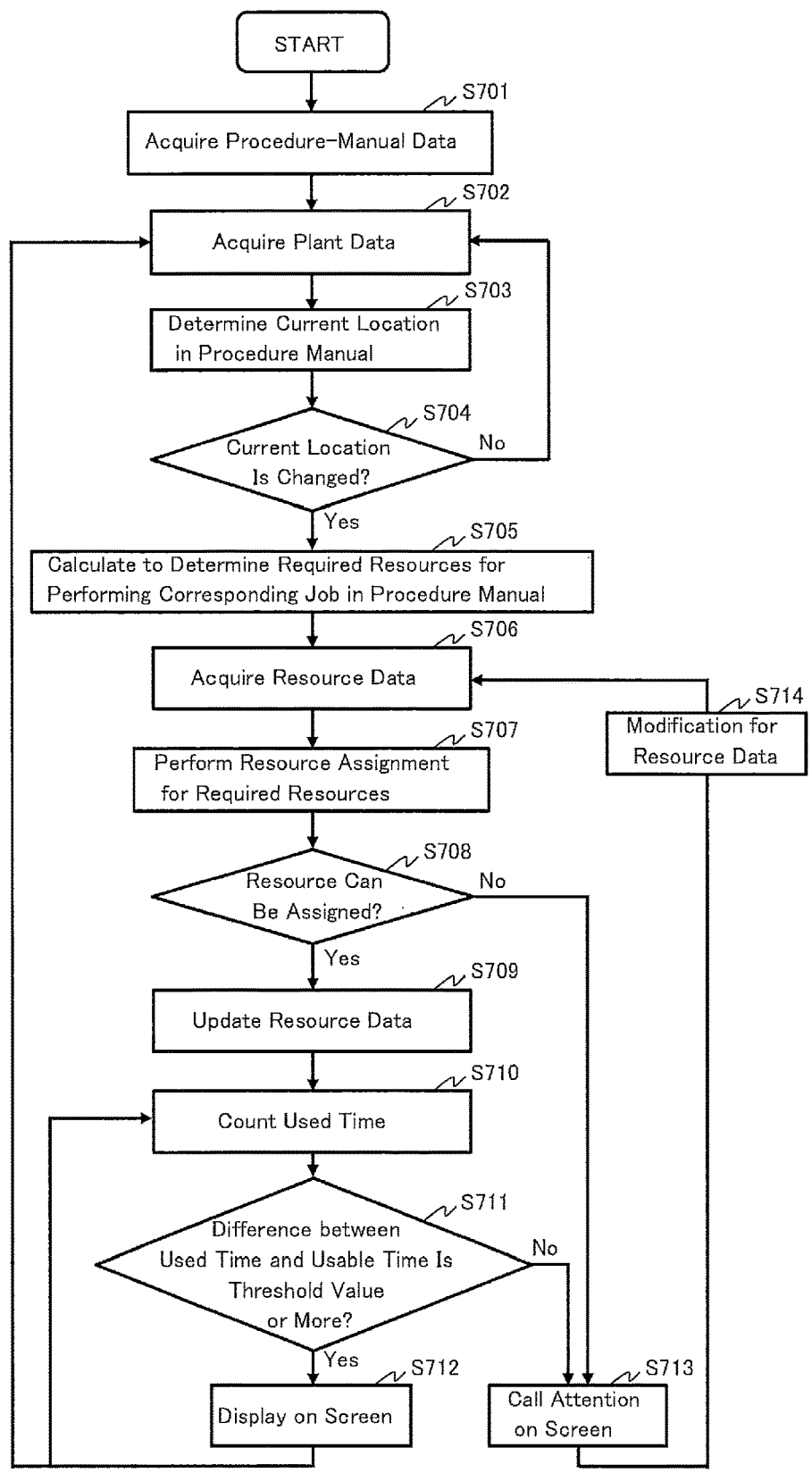
FIG. 7 is a flowchart for illustrating operations for current situation management by the plant operation support-system server in the plant operation support system according to Embodiment 1 of the invention.
Figure 8:
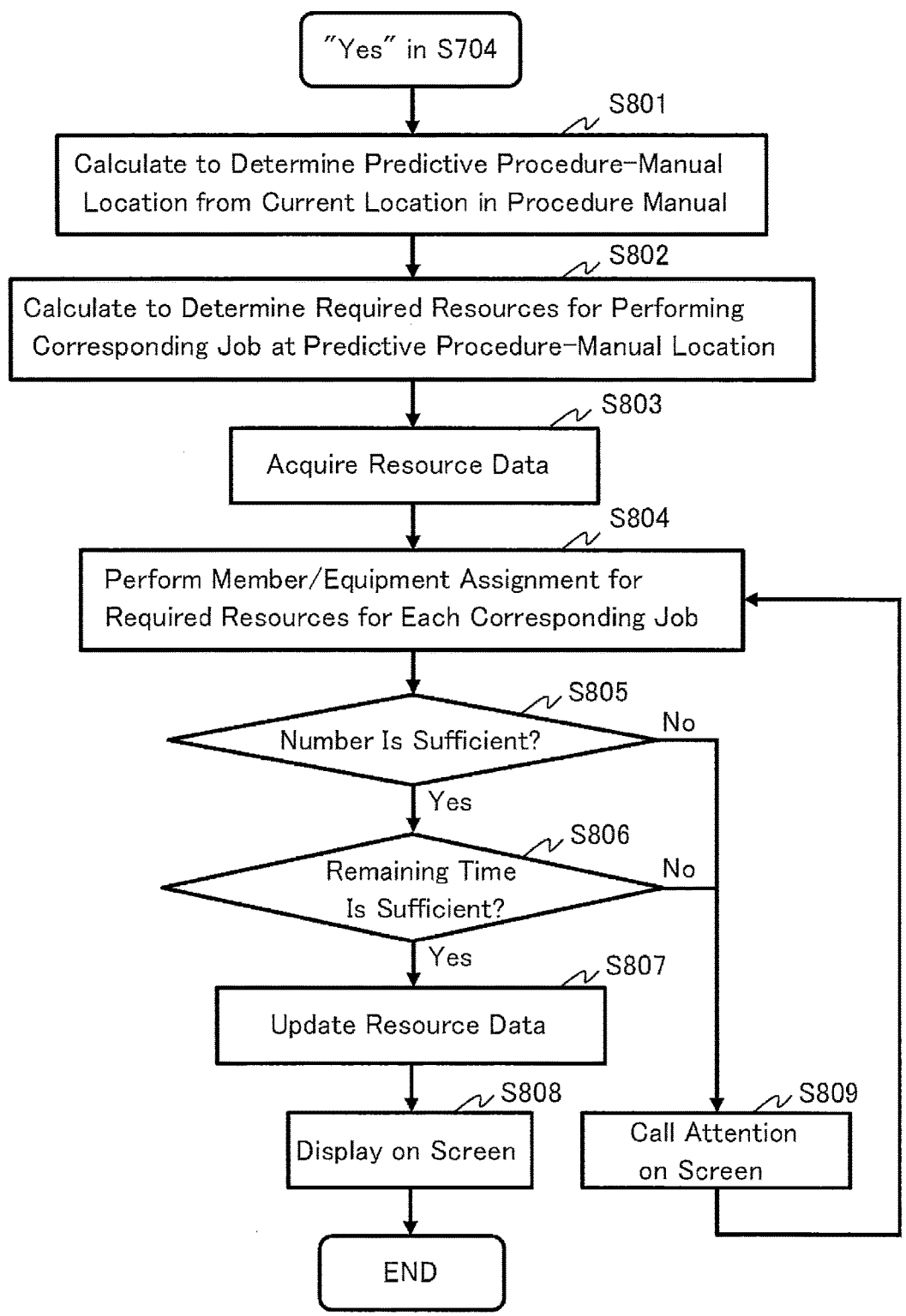
FIG. 8 is a flowchart for illustrating operations for future prediction by the plant operation support-system server in the plant operation support system according to Embodiment 1 of the invention.

Next, operations of the plant operation support-system server 51 in the plant operation support system 510 according to Embodiment 1 of the invention will be described with reference to FIG. 7 and FIG. 8. FIG. 7 is a flowchart showing how the plant operation support system 510 according to Embodiment 1 makes a current-situation management. FIG. 8 is a flowchart showing how to make a future prediction.

With respect to the current-situation management, as shown in FIG. 7, the control unit 116 of the plant operation support-system server 51 firstly causes the procedure-manual data acquisition unit 102 to read the procedure-manual data $D_M$ from the procedure-manual data storage unit 113 into the temporary storage unit 115 (Step S701). In the procedure-manual data $D_M$, a plant-operation principle and job contents are written for each arbitrary condition (at a normal time or at an accident time) of a plant.

Subsequently, the control unit 116 causes the plant data acquisition unit 101 to read the plant data coming from the sensors 1 through the plant network 2 into the temporary storage unit 115, at a constant frequency (Step S702). The plant data means values indicative of a condition of the plant, such as an output, a pressure, a temperature, a water volume and the like, of the plant.

Then, the control unit 116 causes the current procedure-manual location determination unit 103 to determine the current location in the procedure-manual data $D_M$, from the plant condition about the output, the pressure, the temperature, the water volume and the like indicated by the plant data coming from the sensors 1 (Step S703), and judges whether or not there is a change in the current location (Step S704). Note that, when no plant data can be acquired, it is allowable that the display control unit 111 displays on its screen something indicating that fact and then a user determines the current location in the procedure-manual data $D_M$.

When the current location is not changed from that previously determined (Step S704, "No"), because resources have already been assigned, the control unit 116 causes the plant data acquisition unit 101 to acquire the plant data, again (Step S702). When the current location is changed (Step S704, "Yes"), it is necessary to assign resources. Thus, in order to determine the job contents to be currently executed, such as, activation of a pump, starting of power feeding and the like, the resources required for performing the job contents to be currently executed, are determined by the required-resource determination unit 104 and then stored in the temporary storage unit 115 (Step S705). The required resources mean staff members (the number of members and/or the number of licensed members), pieces of equipment (the names and/or the number thereof), instruments (the names and/or the number thereof), and the like.

Subsequently, the control unit 116 causes the resource-data acquisition and updating unit 105 to read the resource data $D_R$ from the resource data storage unit 114 into the temporary storage unit 115 (Step S706). The resource data $D_R$ means overall information related to resources, such as: the number, the names, the licenses, the locations, the workable number, the work details, the workable times and the worked times, of the staff members currently staying in the plant; the respective numbers, the names, the locations, the supply capacities, the operation details, the operable times and the operated times, of the pieces of equipment; and the respective numbers, the names and the locations of the instruments.

Subsequently, with respect to the required resources, the control unit 116 causes the current-situation management determination unit 107 to attempt to perform resource assignment from the resource data $D_R$ (Step S707), and judges whether each of the resources can be assigned or not (Step S708). Note that, when the current location determined by the current procedure-manual location determination unit 103 has moved ahead in the procedure-manual data $D_M$, it is determined that the previous job has been completed and the application of the resources for that job has been completed, so that these resources will be handled each as an assignable resource in consideration of its applied/used time counted by the time counting unit 106. However, the equipment that has to be kept installed after the completion of the job is not handled as an application completed resource.

When the resource can not be assigned (Step S708, "No"), the control unit 116 causes the display control unit 111 to display on its screen, something indicating that this resource can not be assigned, for example, a mark "!", in the item of "Reserved" as shown in FIG. 9, to thereby prompt the user to make supplement/modification for the resource data $D_R$ (Step S713). When the modification of the resource data $D_R$ is made by the user (Step S714), the resource data $D_R$ is reacquired, so that another resource will be assigned by the current-situation management determination unit 107 (the flow returns to Step S706).

When the resource can be assigned (Step S708, "Yes"), the control unit 116 determines that the assigned resource is in use for its corresponding job, and causes the resource-data acquisition and updating unit 105 to update the resource data $D_R$ (Step S709). When the resource data $D_R$ in the temporary storage unit 115 is modified or updated, the resource-data acquisition and updating unit 105 writes in the resource data storage unit 114, the modified/updated content as an assigned list. Note that how to specifically assign the resource (for example, how to specifically designate a staff member) may be in such a manner that the candidates thereof are displayed on the screen by the display control unit 111 and the user chooses the resource among them.

Then, the control unit 116 causes the time counting unit 106 to count the elapsed time from the start of use up to the present time for each of the resources assigned by the current-situation management determination unit 107 (Step S710). The elapsed time is compared with the workable time/operable time, per each resource (Step S711), and when the difference compared with the elapsed time is equal to or more than a threshold value that is a predetermined specific value (namely, sufficient time remains), or equal to or more than zero (Step S711, "Yes"), each resource assigned by the current-situation management determination unit 107 and each time being counted by the time counting unit 106 are displayed on the screen by the display control unit 111, with the items of "Reserved", "In-Use" and "Elapsed Time" as shown in FIG. 9 (Step S712).

As further operations, the control unit 116 continues to cause counting of time (returns to Step S710) and returns to the step of acquiring the plant data $D_P$ (returns to Step S702). When the difference becomes less than the threshold value, or less than zero (Step S711, "No"), the control unit causes the display control unit 111 to call the user's attention by displaying something indicating that the remaining usable time becomes short, for example, a mark "!", in the item of "Remaining Time" as shown in FIG. 9, to thereby prompt the user to make supplement/modification for the resource data $D_R$ (returns to Step S713). When the modification of the resource data $D_R$ is made (Step S714), the resource data $D_R$ is reacquired, so that another resource will be assigned by the current-situation management determination unit 107 (returns to Step S706).

The future prediction is carried out in parallel with the above current-situation management. As shown in FIG. 8, when "Yes" is given at the stage of Step S704, the control unit 116 of the plant operation support-system server 51 causes the predictive procedure-manual location determination unit 108 to predict the procedures and the job contents that are expected to be executed next, based on the plant data $D_P$, the procedure-manual data $D_M$ and the given location in the procedure-manual data $D_M$ determined by the current procedure-manual location determination unit 103 (Step S801).

Then, the control unit 116 causes the predictive required-resource determination unit 109 to determine the resources required for carrying out the job contents that have been determined as they are expected to be executed, by the predictive procedure-manual location determination unit 108, and stores the resources in the temporary storage unit 115 (Step S802). Subsequently, the control unit 116 causes the resource-data acquisition and updating unit 105 to read the resource data $D_R$ from the resource data storage unit 114 into the temporary storage unit 115 (Step S803).

Subsequently, with respect to the required resources determined by the predictive required-resource determination unit 109, the control unit 116 causes the predictive management determination unit 110 to attempt to perform resource assignment from the resource data $D_R$ for each corresponding job (Step S804), and judges whether the each number of resources is sufficient or not and whether each remaining usable time is sufficient or not (Steps S805, S806). When the assignment is not allowable due to deficiency in the number or the like (Step S805, "No"), the control unit causes the display control unit 111 to call the user's attention by displaying, for example, a mark "!" in the item of "Next Required Number" as shown in FIG. 9 (Step S809). Further, when the number is sufficient (Step S805, "Yes") but the remaining usable time measured by the time counting unit 106 is insufficient (Step S806, "No"), the control unit causes the display control unit 111 to call the user's attention by displaying, for example, a mark "!" in the item of "Next Required Time" as shown in FIG. 9 (Step S809).

When the remaining usable time is sufficient as well (Step S806, "Yes"), the control unit 116 determines that the resource is planned to be used in that job, and causes the resource-data acquisition and updating unit 105 to update the resource data $D_R$ (Step S807). When the resource data $D_R$ in the temporary storage unit 115 is modified or updated, the resource-data acquisition and updating unit 105 writes in the resource data storage unit 114, the modified/updated content as an assignment plan list. Further, the display control unit 111 displays on the screen each resource that is determined by the predictive management determination unit 110 as it is planed to be assigned, with the items of "Next Required Number" and "Next Required Time" as shown in FIG. 9 (S808).

In this manner, in the plant operation support-system server 51, the future prediction is carried out in parallel with the current-situation management, so that it is possible to manage the current situation of the resources that are required for performing the jobs corresponding to the procedure manual, and further to achieve resource management with enough margin based on the future prediction, so that the operability of the plant can be improved.

As described above, in accordance with the plant operation support system 510 according to Embodiment 1 of the invention, the control unit 116 of the plant operation support-system server 51 causes the current procedure-manual location determination unit 103 to determine the current location in the procedure-manual data $D_M$, based on the condition of the plant acquired through the sensors 1 by the plant data acquisition unit 101, and when there is a change in the current location, the control unit causes the current-situation management determination unit 107 to assign currently-required resources and causes the predictive management determination unit 110 to predict presence/absence of resource deficiency, according to the current position. Thus, it is possible not only to manage the current situation of the resources required for performing the jobs corresponding to the procedure manual, but also to achieve resource management with enough margin based on the future prediction, so that the operability of the plant can be improved.

Figure 10A:
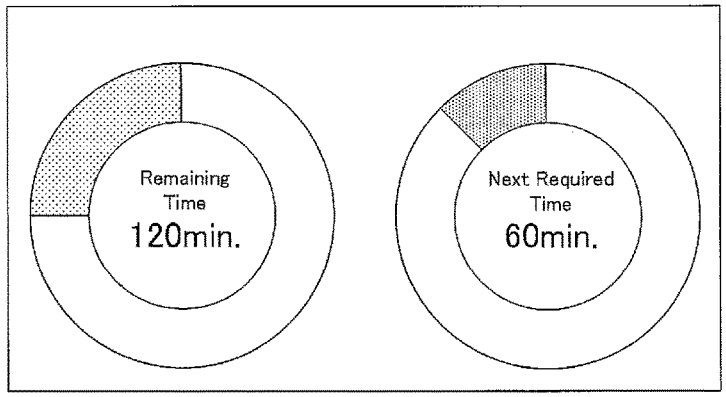
FIGS. 10A to 10F are each a diagram showing another display example by the plant operation support-system server in the plant operation support system according to Embodiment 1 of the invention.

It is noted that, in Embodiment 1, values of "Elapsed Time", "Remaining Time" and "Next Required Time" are displayed in table form by the display control unit 111; however, this is not limitative, and as shown, for example, in FIG. 10A, it is allowable that any of these values is calculated as a ratio to "Operable Time" and displayed in a form of circular graph by the display control unit 111. Further, in order to call the user's attention, the circular graph may be displayed with an easily-recognizable warning color, such as red, etc. This makes the values easier to be recognized visually.

Figure 10B:
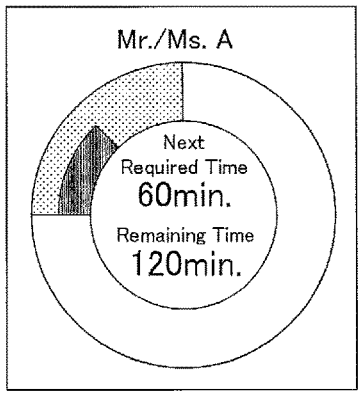
Figure 10C:
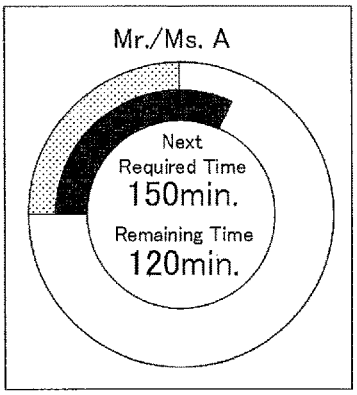

Further, as shown in FIG. 10B and FIG. 10C, it is allowable that the ratios of "Remaining Time" and "Next Required Time" relative to "Operable Time" are calculated and displayed in a circular graph with concentric circles. When both the ratios of "Remaining Time" and "Next Required Time" relative to "Operable Time" are thus displayed in the same circular graph, the values become easier to be visually recognized than otherwise because of reduced movement of the sight line. Further, when "Remaining Time" and "Next Required Time" are displayed in the same circular graph in an overlapping fashion, the length relationship of "Next Required Time" to "Remaining Time" becomes easier to be understood. In order to call the user's attention in the event that "Next Required Time" is longer than "Remaining Time", the circular graph may be displayed, entirely or partially with an easily-recognizable warning color, such as red, etc. This makes that event easier to be recognized visually.

Figure 10D:
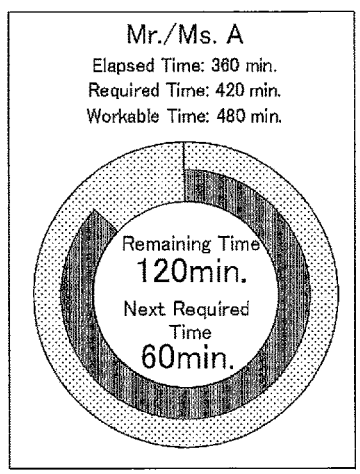
Figure 10E:
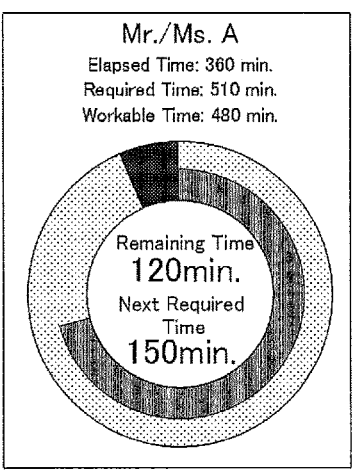
Figure 10F:
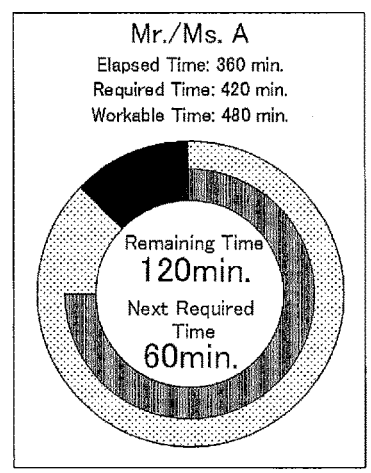

Furthermore, as shown in FIG. 10D, when the required time is equal to or less than the workable time, the ratio of "Elapsed Time" to "Workable Time" may be indicated and displayed in a circular graph with concentric circles. Further, as shown in FIG. 10E, the ratios of "Workable Time" and "Elapsed Time" relative to "Required Time" may be indicated and displayed in a circular graph with concentric circles. When the required time is more than the workable time, a portion in the required time beyond the workable time, is displayed with an easily-recognizable warning color, such as red, etc. Further, when the required time is equal to or less than the workable time, instead of the example in FIG. 10D, the ratios of "Required Time" and "Elapsed Time" relative to "Workable Time" may be indicated and displayed in a circular graph with concentric circles, as shown in FIG. 10F. When the workable time is longer than the required time, a portion in the workable time beyond the required time is displayed with a color indicative of margin/allowance. For example, the portion in the workable time beyond the required time may be displayed colorlessly.

In the examples shown in FIG. 10D to FIG. 10F, when, in the same circular graph, a ratio of "Working Time Required for Next Job" [Next Required Time], "Lacking Amount of Time" or the like relative to "Required Time" is further displayed, or a ratio of "Remaining Time", "Next Required Time", "Time Margin/Allowance" or the like relative to "Workable Time" is further displayed, the ratio become easier to be visually recognized than otherwise because of reduced movement of the sight line. Further, when "Remaining Time" and "Next Required Time" are displayed in the same circular graph in an overlapping fashion, the length relationship of "Next Required Time" to "Remaining Time" becomes easier to be understood. In order to call the user's attention in the event that "Next Required Time" is longer than "Remaining Time", the circular graph may be displayed, entirely or partially with an easily-recognizable warning color, such as red, etc. This makes that event easier to be recognized visually.

In this manner, displaying in a form of circular graph makes it possible for the user to easily confirm the workable/operable time of the resource, the elapsed time, the remaining time and the next required time, so that the operability of the plant can be improved.

By the way, in Embodiment 1, reserved numbers, numbers in use and next required numbers, as an assignment result of resources, are displayed by the display control unit 111; however, this is not limitative. For example, as shown in FIG. 11, the display control unit 111 may display, as an assignment result of resources, not only the numbers in use in the current job (referred to as Job 1 in this embodiment) and the reserved numbers at the start time of Job 1, but also required numbers after the completion of Job 1 and reserved amounts at the start time of Job 1, as well as required numbers after the completion of each of Job 2 and its following jobs, and expected-reserved amounts based on an assignment result at the start time of each of Job 2 and its following jobs. When the resource can not be assigned, its corresponding required number/amount is displayed on the screen with something indicating that this resource can not be assigned, for example, a mark "!", to thereby prompt the user to make supplement/modification for the resource data. It is allowable that, when the modification of the resource data is made, the resource data $D_R$ is reacquired and another resource is assigned by the current-situation management determination unit 107.

Figure 12:
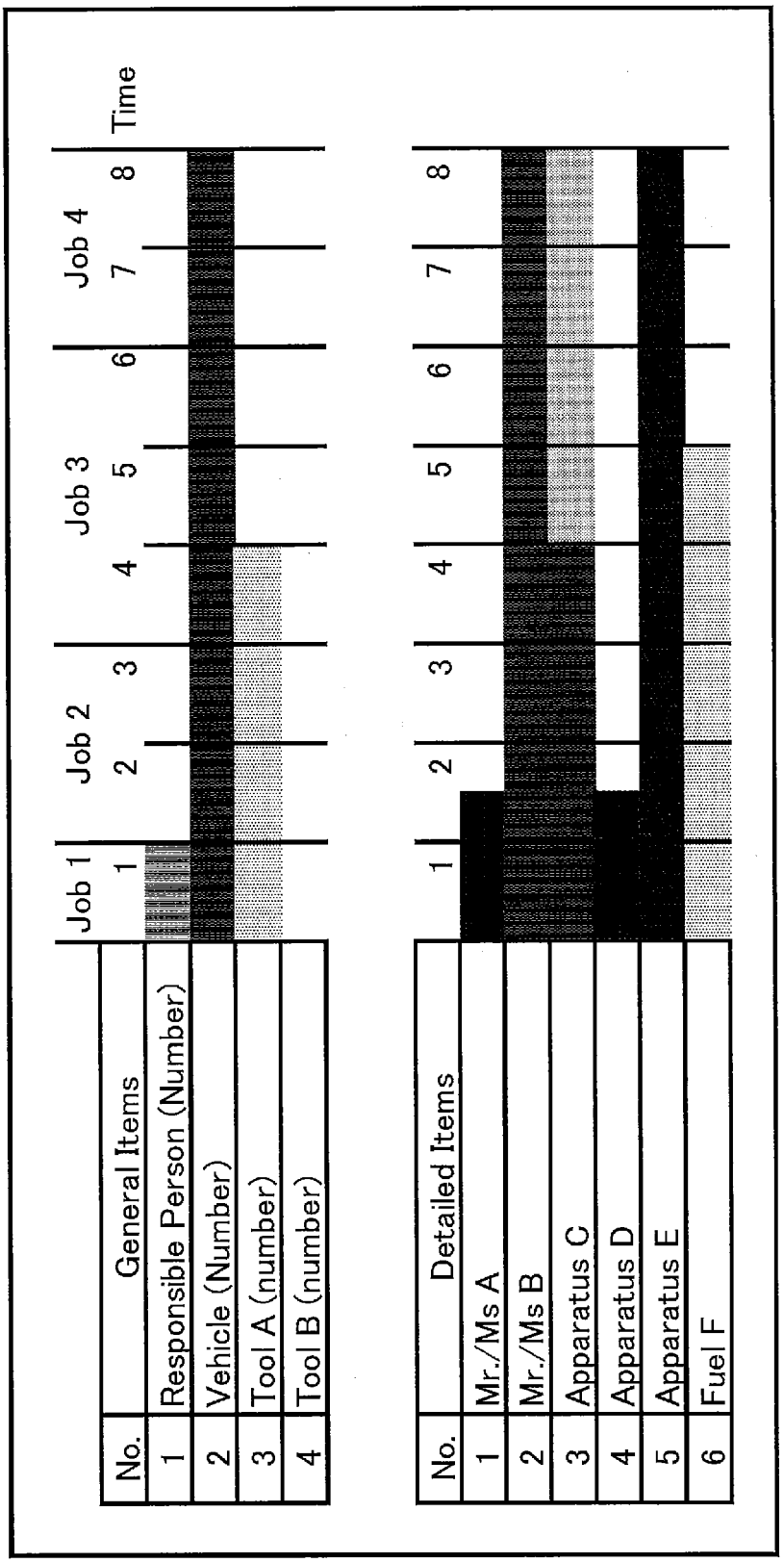
FIG. 12 is a diagram showing another display example by the plant operation support-system server in the plant operation support system according to Embodiment 1 of the invention.

Furthermore, the display control unit 111 may indicate whether or not each resource could be assigned for each type of job, by displaying, for example, the types of jobs in a horizontal direction in order according to the scenario and the types (items) of required resources in a vertical direction, as shown in FIG. 12. It is also allowable to display as a bar graph-like form, the jobs for which the resource assignment has been completed, as well as to indicate whether or not each resource could be assigned to each type of jobs, in table form, using a symbol of YES/NO, OK/NG or o/x, or a check mark, or the like. Such displaying makes the user understand at a glance that, up to which one of the jobs each resource could be assigned. Thus, it becomes easier to understand resource deficiency/excessiveness, and to determine resource-procurement priorities in the case of resource deficiency.

Further, in addition to displaying the types of jobs in a horizontal direction in order according to the scenario, it is allowable to display together each time period from the present time to a time at which each job is expected to be completed. In that case, standard time periods required for the respective jobs are prestored in the procedure-manual data, and at the time of calculation for resource assignment, etc., each time period from the present time is calculated and displayed through integration of corresponding ones of the standard time periods required for the respective jobs. When there is a difference between the standard time periods for the respective jobs, the horizontal axis in FIG. 12 is indicated by the same time scales, so that the widths of job-type indication areas are adjusted (Job 3 and Job 4 in FIG. 12), and then whether each resource is assignable or not is indicated as a bar graph-like form. This makes the user intuitively understand that, up to which time in the future each resource can be assigned, so that the user becomes easier to determine time-dependent priorities for resource procurement. Further, in order to call the user's attention in the event of resource deficiency in the current job or resource deficiency in the next job, the item or the graph of the corresponding resource may be displayed with an easily-recognizable warning color, such as yellow, red, etc. This makes that event easier to be recognized visually. With respect to the resources of consumable items, such as a fuel, a chemical agent, cooling water and the like, in order to indicate whether each resource is assignable or not, it is desirable that information about required amounts of each of the consumable items for the respective jobs, or per-hour required amounts of each of the consumable items for the respective jobs, be stored in the procedure manual. Note that in the display example in FIG. 12, if the vertical arrangement and the horizontal arrangement are replaced with each other, an effect equivalent to the above is of course accomplished.

Figure 13A:
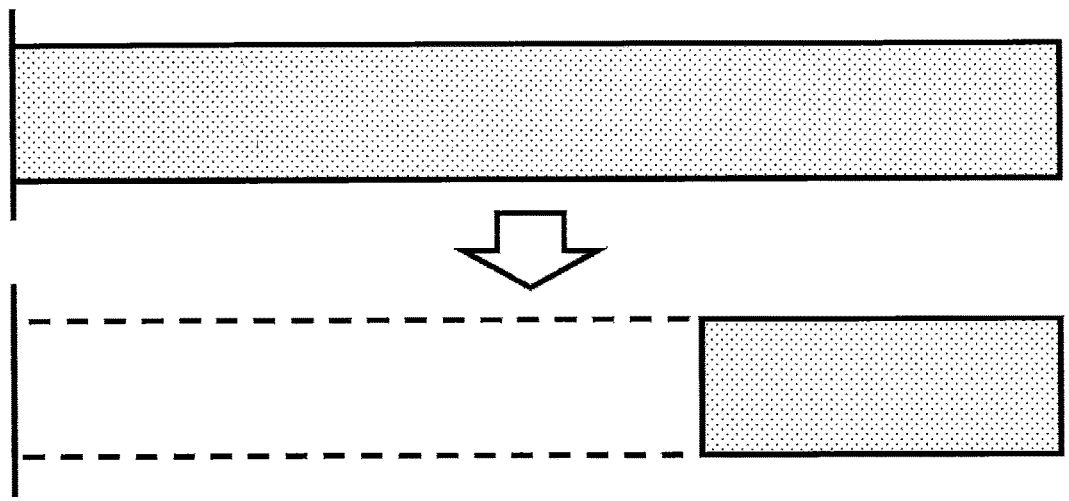
FIGS. 13A and 13B are each a diagram showing another display example by the plant operation support-system server in the plant operation support system according to Embodiment 1 of the invention.
Figure 13B:
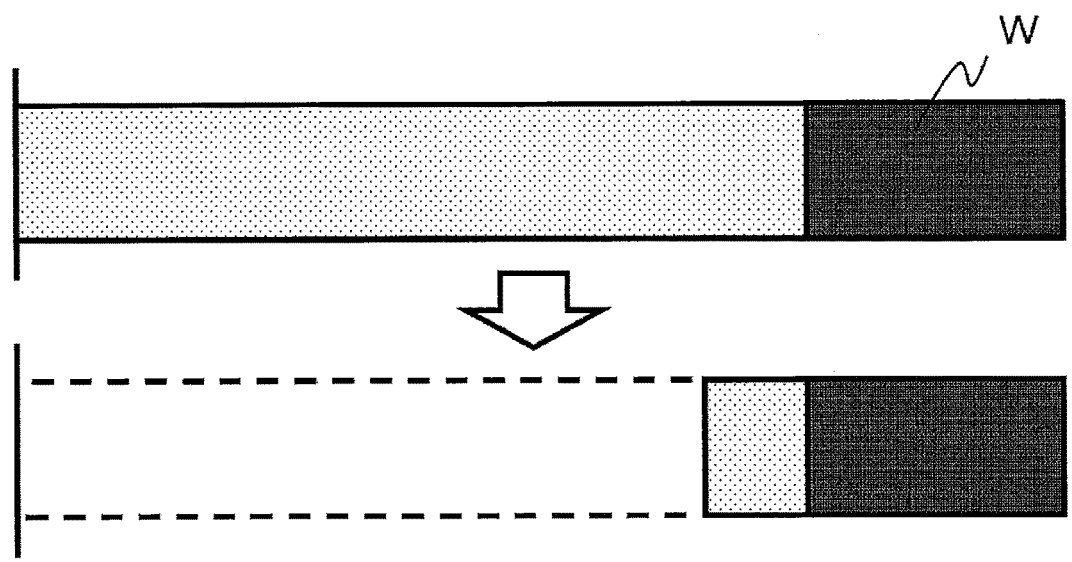

Meanwhile, as a predicted resource usable amount, a pump usable time may be displayed as shown in FIG. 13A and FIG. 13B, for example. FIG. 13A shows a case where the pump usable time is equal to or more than a pump required time (Pump Usable Time Pump Required Time), and FIG. 13B shows a case where the pump usable time is less than the pump required time (Pump Usable Time<Pump Required Time). The length of each bar graph indicates the pump usable time or the pump required time. As shown in FIG. 13A, when the pump usable time is equal to or more than the pump required time, an already-elapsed portion thereof is differently indicated (by blank space or broken line) according to the lapse of time. Also, as shown in FIG.

13B, when the pump usable time is less than the pump required time, an already-elapsed portion thereof is differently indicated (by blank space or broken line) according to the lapse of time; however, a warning indication portion W (a portion in red, etc.) is shown that is indicative of a lacking amount of time (=the required time–the usable time), and when the pump usable time becomes longer to be equal to or more than the pump required time, due to refueling or the like, the bar graph is updated so that the warning indication portion W disappears.

Further, with respect to a scenario of injecting water into a steam generator, a predicted resource usable amount may be indicated as shown in FIG. 14, for example. As shown in FIG. 14, for each of the jobs, a lacking item(s) is displayed for indicating warning. The status, the starting date and time, the completion date and time, and/or the assigned resource items may be displayed.

As described above, not only the assignment result for the current job but also that for the following job(s) are displayed concurrently, so that it becomes easier to understand resource deficiency/excessiveness, and to determine a degree of resource deficiency and resource-procurement priorities. In addition, when the expected required times for the respective jobs are reserved as information in the procedure-manual data, it becomes easier to understand that, up to which time the resource will remain available. Furthermore, when the required amounts of respective consumable items are stored in the procedure-manual data, it becomes easier to understand that, up to which one of the jobs or which time the consumable item could be assigned. Further, when the types and usable amounts of the resources (for example, a fuel) to be used in the apparatuses employed in the procedures, are stored in the procedure-manual data, it becomes possible to perform calculation for assigning to the different apparatuses, the resource (for example, a fuel) commonly used therein.

Embodiment 2

Embodiment 1, a case has been shown where the resource assignment is performed separately for each corresponding job; however, in Embodiment 2, a case will be shown where the resource assignment is performed when multiple jobs are to be executed concurrently.

In a plant operation support-system server 52 that is a main part of a plant operation support system 520 according to Embodiment 2 of the invention, a current-situation management determination unit 117 can control multiple jobs to be executed concurrently according to a situation, and attempts to perform resource assignment for the corresponding multiple jobs to be executed, according to their priorities, and judges whether each resource is assignable or not. Also, a predictive management determination unit 118 can control multiple jobs to be executed concurrently according to a situation, and attempts to perform resource assignment for the corresponding multiple jobs to be executed, according to their priorities, and judges whether the number is sufficient or not and the remaining usable time is sufficient or not. The priorities are preset in the procedure-manual data. The other configuration of the plant operation support-system server 52 is the same as in the plant operation support-system server 51 of Embodiment 1, so that the same reference numerals are given to their corresponding parts and description thereof is omitted here.

Figure 15:
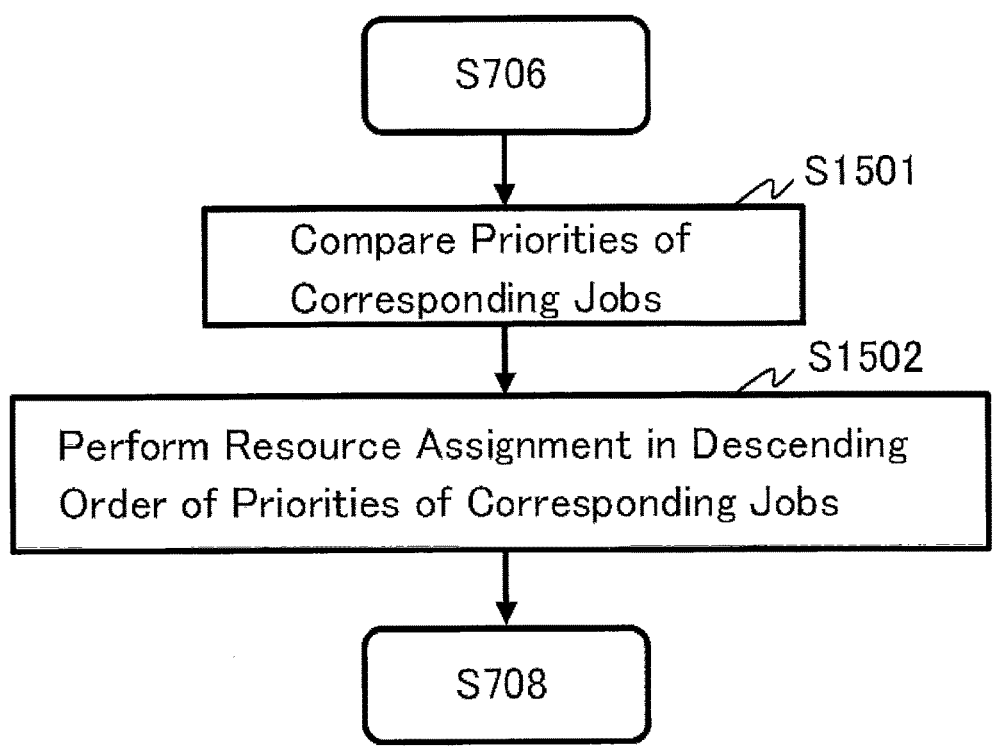
FIG. 15 is a flowchart for illustrating operations for current situation management by a plant operation support-system server in a plant operation support system according to Embodiment 2 of the invention.
Figure 16:
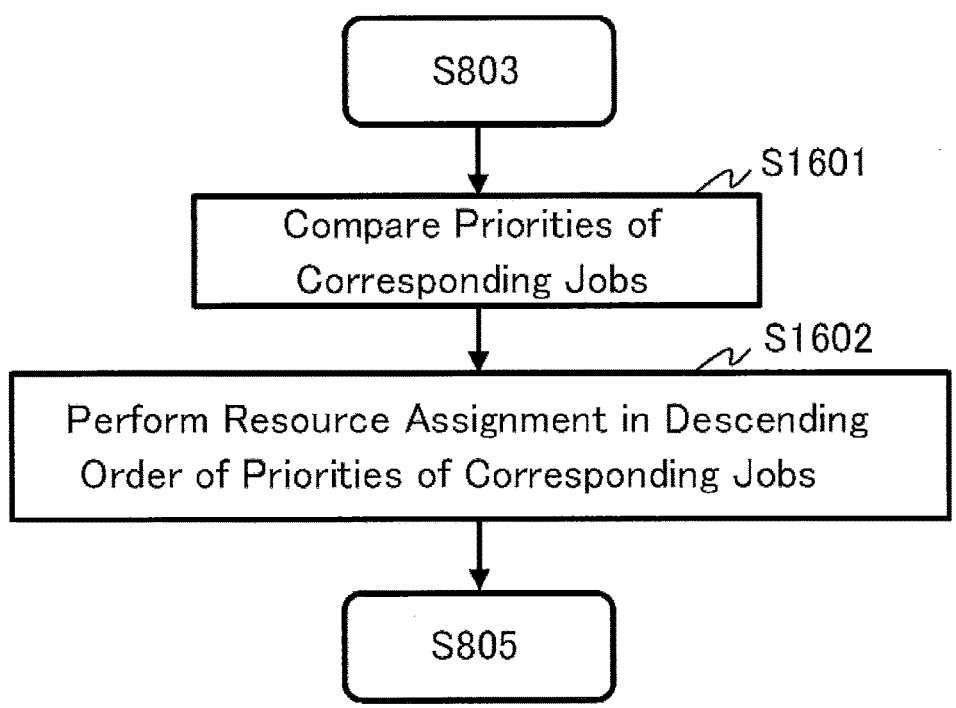
FIG. 16 is a flowchart for illustrating operations for future prediction by the plant operation support-system server in the plant operation support system according to Embodiment 2 of the invention.

Next, operations of the plant operation support-system server 52 in the plant operation support system 520 according to Embodiment 2 of the invention will be described with reference to FIG. 15 and FIG. 16. FIG. 15 is a flowchart showing how the plant operation support system 520 according to Embodiment 2 makes a current-situation management. FIG. 16 is a flowchart showing how to make a future prediction.

With respect to the current-situation management, as shown in FIG. 15, such operations are firstly carried out that are similar to in the flow from Step S701 to Step S706 shown in FIG. 7 in Embodiment 1. Subsequently, the control unit 116 of the plant operation support-system server 52 causes the current-situation management determination unit 117 to compare with each other the priorities of the corresponding multiple jobs to be executed (Step S1501), and to assign resources to the corresponding jobs in descending order of their priorities (Step S1502). Thereafter, the flow moves to the step of determining assignability (moves to Step S708).

The future prediction is carried out in parallel with the above current-situation management, and as shown in FIG. 16, such operations are firstly carried out that are similar to in the flow from Step S801 to Step S803 shown in FIG. 8, when "Yes" is given at the stage corresponding to Step S704 in FIG. 7 shown in Embodiment 1. Subsequently, the control unit 116 causes the predictive management determination unit 118 to compare with each other the priorities of corresponding multiple jobs to be executed (Step S1601), and to assign resources to the corresponding jobs in descending order of their priorities (Step S1602). Then, such operations are carried out that are similar to in the flow from Step S805 to Step S809 shown in FIG. 8 in Embodiment 1.

As described above, in accordance with the plant operation support system 520 according to Embodiment 2 of the invention, the control unit 116 of the plant operation support-system server 52 causes the current-situation management determination unit 117 and the predictive management determination unit 118 to attempt to perform their respective assignment according to the priorities of the corresponding multiple jobs to be executed. Thus, if a situation arises in which the corresponding multiple jobs have to be executed concurrently, it is possible to perform the resource assignment according to the priorities, so that the operability of the plant can be improved.

Embodiment 3

Although whether the number and the remaining time are sufficient or not is determined by the predictive management determination unit in Embodiment 1, such a corresponding job exists that drastically decreases the number and the remaining time depending on circumstances. For example, there is a case where the operation of a machine A in a corresponding job makes the power load increase drastically, resulting in rapid and early depletion of the fuel serving as a source of operating power. In Embodiment 3, a case will be shown where the user is notified of a drastic decrease of resource caused by a predicted corresponding job.

In a plant operation support-system server 53 that is a main part of a plant operation support system 530 according to Embodiment 3 of the invention, a predictive management determination unit 119 has, in addition to the functions of the aforementioned predictive management determination unit 110, a function to determine, after updating of the resource data, whether or not the number or the remaining time has decreased, in comparison to that at the time of previous updating of the resource data, to an extent equal to or more than a threshold value that is a predetermined set value (namely, it has decreased drastically). If the number or the remaining time has decreased drastically, the display control unit 111 displays something indicating that fact on the screen. For that purpose, it is also allowable to instead determine, after updating of the resource data, whether or not the decreased amount per unit of time based on the elapsed time from the previous updating of the resource data, is a specified value or more. Furthermore, when a difference between a remaining time calculated based on a current decreasing rate and a required time from the present time to the completion of the job is less than a threshold value, it is also allowable to display on the screen something indicating that fact. The other configuration of the plant operation support-system server 53 is the same as in the plant operation support-system server 51 of Embodiment 1, so that the same reference numerals are given to their corresponding parts and description thereof is omitted here.

Figure 17:
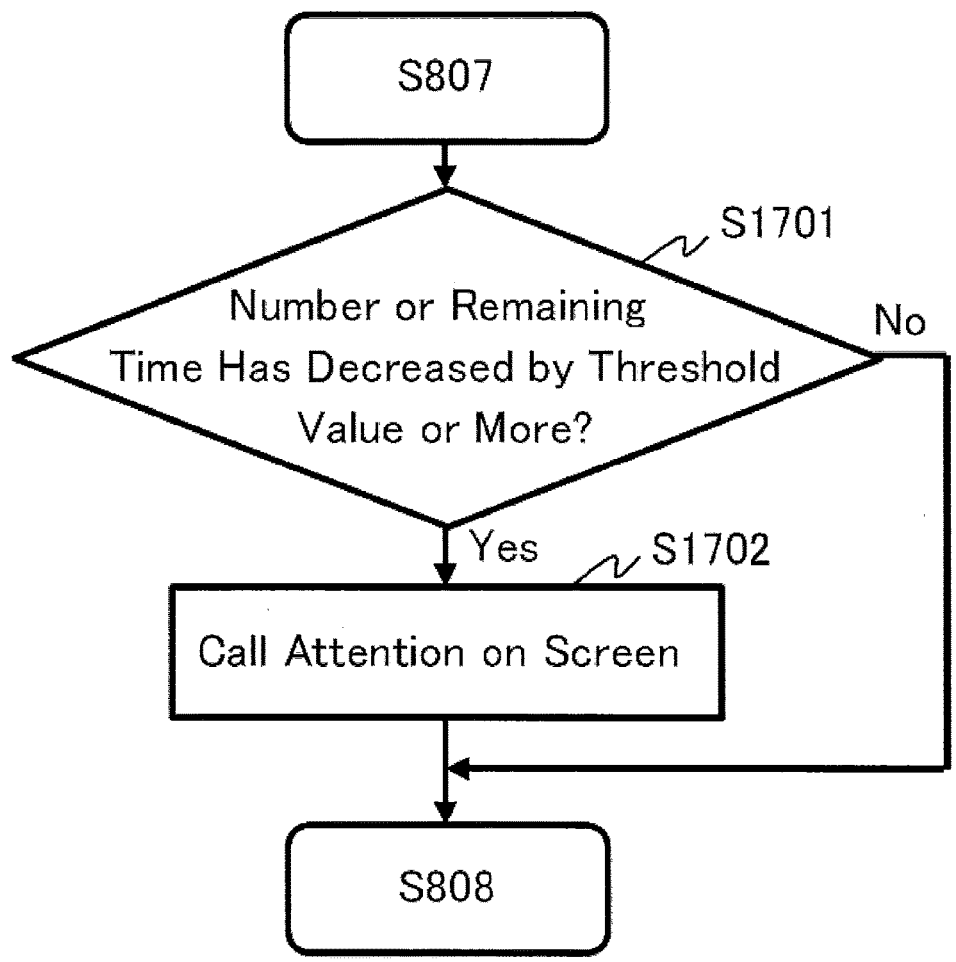
FIG. 17 is a flowchart for illustrating operations for future prediction by a plant operation support-system server in a plant operation support system according to Embodiment 3 of the invention.

Next, operations of the plant operation support-system server 53 in the plant operation support system 530 according to Embodiment 3 of the invention will be described with reference to FIG. 17. FIG. 17 is a flowchart showing how the plant operation support system 530 according to Embodiment 3 makes a future prediction. With respect to the current situation management, such operations are carried out that are similar to in the flow shown in FIG. 7 in Embodiment 1.

The future prediction is carried out in parallel with the above current-situation management, and as shown in FIG. 17, such operations are firstly carried out that are similar to in the flow from Step S801 to Step S807 shown in FIG. 8, when "Yes" is given at the stage corresponding to Step S704 in FIG. 7 shown in Embodiment 1. Subsequently, the control unit 116 causes the predictive management determination unit 119 to determine whether or not the number or the remaining time has decreased to an extent equal to or more than the threshold value (namely, it has decreased drastically) (Step S1701), and if it has decreased drastically (Step S1701, "Yes"), causes the display control unit 111 to display something indicative of that fact on the screen to thereby call the user's attention (Step S1702). If it has not decreased to an extent equal to or more than the threshold value, no particular attention is called (Step S1701, "No"), and the assignment result is displayed on the screen (flow moves to Step S808 in FIG. 8). For that purpose, it is also allowable to instead determine, after updating of the resource data, whether or not the decreased amount per unit of time based on the elapsed time from the previous updating of the resource data, is a specified value or more. Furthermore, when a difference between a remaining time calculated based on a current decreasing rate and a required time from the present time to the completion of the job is less than a threshold value, it is also allowable to display on the screen something indicating that fact. Note that, in Embodiment 3, the other configuration than the predictive management determination unit 119 is the same as in Embodiment 1; however, the other configuration is not limited thereto, and may be the same as in Embodiment 2.

As described above, in accordance with the plant operation support system 530 according to Embodiment 3 of the invention, the control unit 116 of the plant operation support-system server 53 causes the predictive management determination unit 119 to find a drastic decrease of resource. Thus, when a drastic decrease of resource occurs by a corresponding job, the user can recognize that fact in an earlier stage, so that the operability of the plant can be improved.

Embodiment 4

In Embodiment 1, a case is assumed where the procedures progress in a given order; however, depending on circumstances, such a case may arises where a flow of the procedures returns back, for example because installed equipment becomes unusable due to a failure or the like. In Embodiment 4, a case will be shown where the equipment that became unusable is precluded from the resource data and then, new resource management is performed accordingly.

In a plant operation support-system server 54 that is a main part of a plant operation support system 540 according to Embodiment 4 of the invention, a current-situation management determination unit 120 has, in addition to the functions of the aforementioned current-situation management determination unit 107, a function to determine whether or not a corresponding job is the job for which resource assignment was executed previously and, if it is so, to compare the resources for the corresponding job with those in the assigned list stored in the resource data storage unit 114, to thereby confirm any resource that became unusable among the assigned resources. As a confirmation method, there is a method in which each candidate of equipment that would have become unusable is displayed on the screen by the display control unit 111, to thereby cause the user to choose it for confirmation. The other configuration of the plant operation support-system server 54 is the same as in the plant operation support-system server 51 of Embodiment 1, so that the same reference numerals are given to their corresponding parts and description thereof is omitted here.

Figure 18:
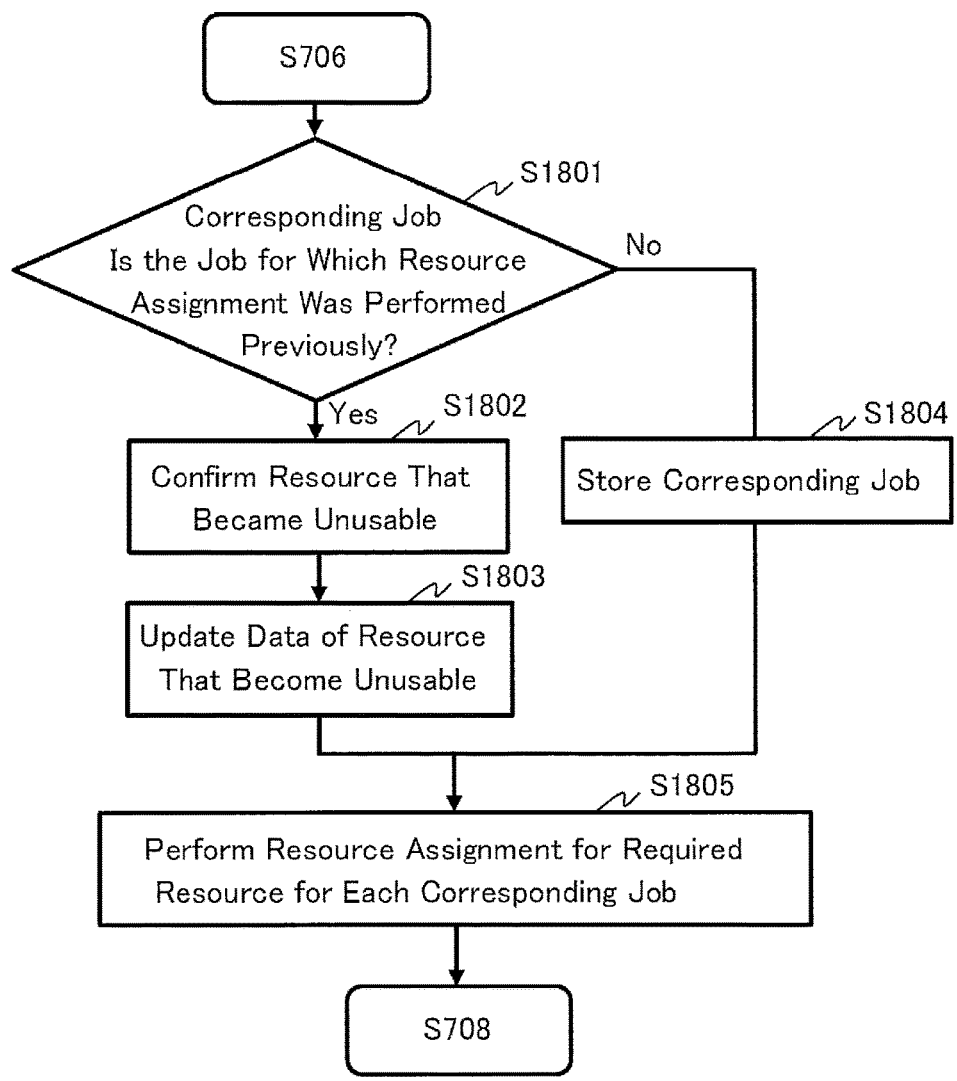
FIG. 18 is a flowchart for illustrating operations for current situation management by a plant operation support-system server in a plant operation support system according to Embodiment 4 of the invention.

Next, operations of the plant operation support-system server 54 in the plant operation support system 540 according to Embodiment 4 of the invention will be described with reference to FIG. 18. FIG. 18 is a flowchart showing how the plant operation support system 540 according to Embodiment 4 makes a current situation management. With respect to the future prediction, such operations are carried out that are similar to in the flow shown in FIG. 8 in Embodiment 1.

With respect to the current-situation management, as shown in FIG. 18, such operations are firstly carried out that are similar to in the flow from Step S701 to Step S706 shown in FIG. 7 in Embodiment 1. Subsequently, the control unit 116 of the plant operation support-system server 54 causes the current-situation management determination unit 120 to determine whether or not a corresponding job is the job for which resource assignment was executed previously and, if it is so, to compare the resources for the corresponding job with those in the assigned list read from the resource data storage unit 114 into the temporary storage unit 115 (Step S1801). When the assignment was not executed (Step S1801, "No"), it is determined that the resources are to be firstly assigned to the corresponding job, so that this job is registered in the assigned list present in the temporary storage unit 115 (Step S1804), and thereafter the current-situation management determination unit attempts to assign the resources (Step S1805).

When the assignment was executed (Step S1801, "Yes"), among the resources that were assigned to the corresponding job, any resource that became unusable is confirmed (Step S1802). As a confirmation method, each candidate of equipment that would have become unusable is displayed on the screen by the display control unit 111, to thereby cause the user to choose it for confirmation. When the resource that became unusable is made clear in this manner, the resource data is updated so as to make the resource unusable (Step S1803). Thereafter, with respect to the resources newly required for the corresponding job, the resource assignment is attempted to be performed (Step S1805) and the flow moves to the step of determining assignability (moves to Step S708). Note that, in Embodiment 4, the other configuration than the current-situation management determination unit 120 is the same as in Embodiment 1; however, the other configuration is not limited thereto, and may be the same as in Embodiment 2 or Embodiment 3.

As described above, in accordance with the plant operation support system 540 according to Embodiment 4 of the invention, the control unit 116 of the plant operation support-system server 54 causes the current-situation management determination unit 120 to confirm that the assignment was already executed, and thereafter to confirm the resource that became unusable. Thus, when a flow of procedures returns back due to the resource that became unusable, it is possible to preclude the resource immediately, so that the operability of the plant can be improved.

Embodiment 5

Although in Embodiment 1, for each of the jobs, one corresponding resource assignment is executed, the assignment is executed according to priorities of resources in Embodiment 5.

In a plant operation support-system server 55 that is a main part of a plant operation support system 550 according to Embodiment 5 of the invention, each of a current-situation management determination unit 121 and a predictive management determination unit 122 compares with each other the priorities of plural resources to be subjected to execution, followed by performing resource assignment preferentially from the resource having a highest priority. The other configuration of the plant operation support-system server 55 is the same as in the plant operation support-system server 51 of Embodiment 1, so that the same reference numerals are given to their corresponding parts and description thereof is omitted here.

Figure 19:
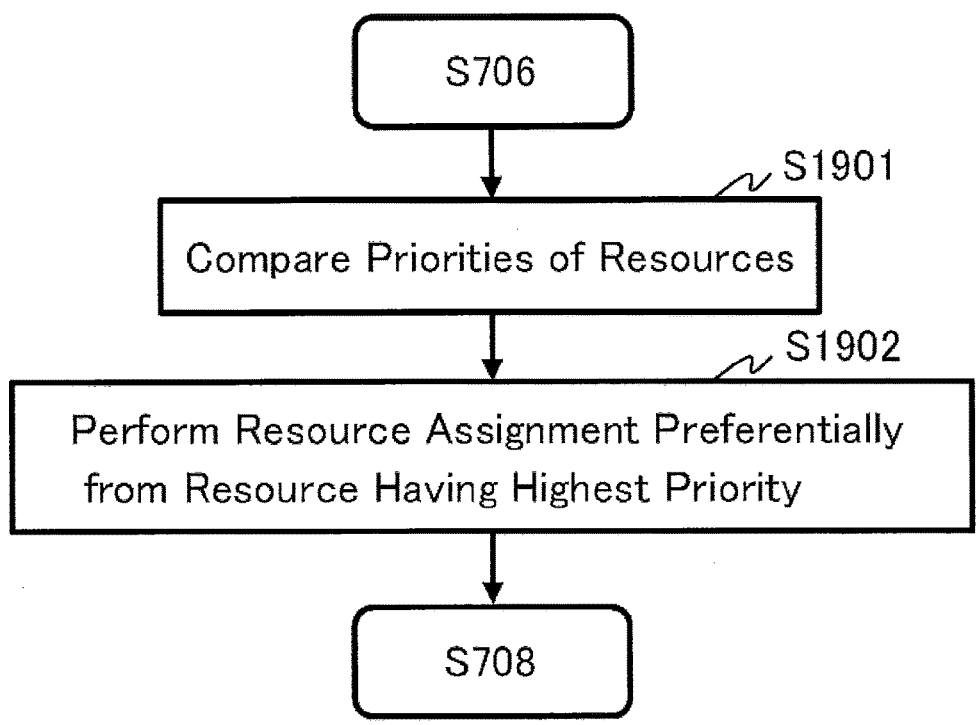
FIG. 19 is a flowchart for illustrating operations for current situation management by a plant operation support-system server in a plant operation support system according to Embodiment 5 of the invention.
Figure 20:
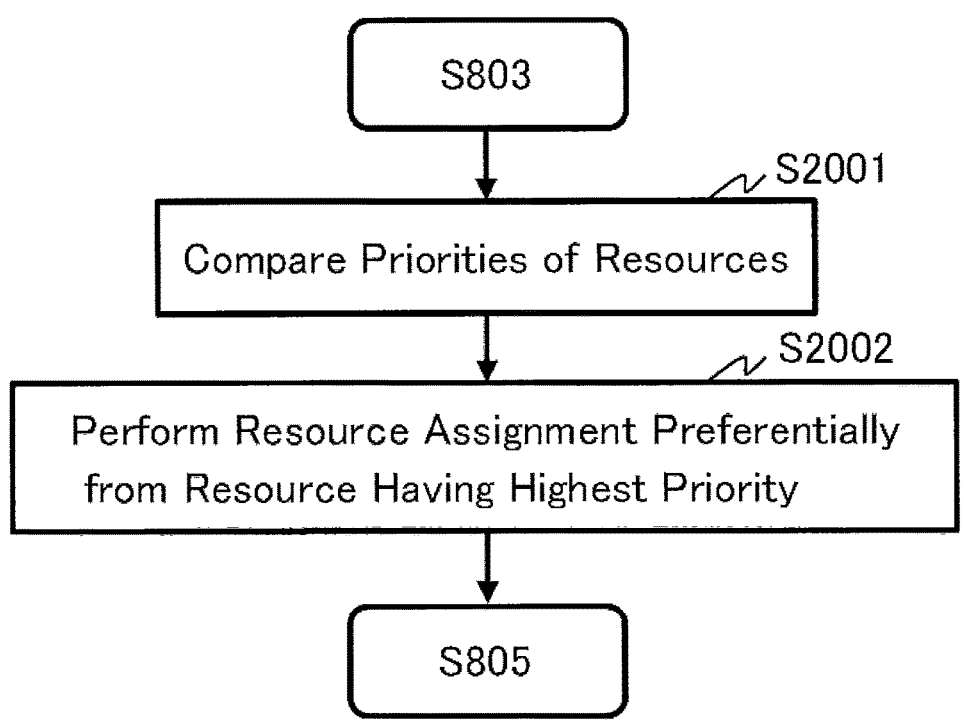
FIG. 20 is a flowchart for illustrating operations for future prediction by the plant operation support-system server in the plant operation support system according to Embodiment 5 of the invention.

Next, operations of the plant operation support-system server 55 in the plant operation support system 550 according to Embodiment 5 of the invention will be described with reference to FIG. 19 and FIG. 20. FIG. 19 is a flowchart showing how the plant operation support system 550 according to Embodiment 5 makes a current-situation management. FIG. 20 is a flowchart showing how to make a future prediction.

With respect to the current-situation management, as shown in FIG. 19, such operations are firstly carried out that are similar to in the flow from Step S701 to Step S706 shown in FIG. 7 in Embodiment 1. Subsequently, the control unit 116 of the plant operation support-system server 55 causes the current-situation management determination unit 121 to compare with each other the priorities of the resources to be subjected to execution in plural storage locations (Step S1901), and then to perform resource assignment preferentially from the resource having a highest priority (Step S1902). Thereafter, the flow moves to the step of determining assignability (moves to Step S708).

The future prediction is carried out in parallel with the above current-situation management, and as shown in FIG. 20, such operations are firstly carried out that are similar to in the flow from Step S801 to Step S803 shown in FIG. 8, when "Yes" is given at the stage corresponding to Step S704 in FIG. 7 shown in Embodiment 1. Subsequently, the control unit 116 causes the predictive management determination unit 122 to compare with each other the priorities of the resources to be subjected to execution in plural storage locations (Step S2001), and then to perform resource assignment preferentially from the resource having a highest priority (Step S2002). Thereafter, the flow moves to the step of determining assignability (moves to Step S805).

In FIG. 21A, there is shown an example of a priority-related portion of the scenario data in which the priorities of resources are set. In this example, with respect to a scenario type, a job type and a resource type for use, the names and priorities of the respective resources to be used are inputted in the scenario data as a part thereof. For the items of the scenario type and the job type (for example, water injection into steam generator and installation of diesel-driven injection pump), when the resource type for use is inputted into the scenario data, the resources usable for the job of that type are specified and their priorities to be assigned for that job are registered. When the respective usable resources and their priorities vary depending on a job type, it suffices to determine for each job type, its usable resources and the priorities among that usable resources, and to register them in the scenario data as apart thereof.

In the example shown in FIG. 21A, with respect the hose to be used in a job for installation of diesel-driven injection pump, a special-purpose hose R1, a general-purpose hose R2 and a general-purpose hose R3 are registered as usable resources, and a highest priority is set to the special-purpose hose R1 for the diesel-driven injection pump. When the priorities are set in this manner, it is possible to preferentially assign the special-purpose hose R1 to the job for installation of diesel-driven injection pump, to thereby achieve improvement in workability of an installation work for attaching the hose. Further, it becomes possible to transfer the general-purpose hose to different use having another purpose. This allows to perform more proper assignment due to little wasted effort/motion for assignment.

Namely, for example, at the time of calculation for assignment to a job P, when an apparatus R and an apparatus S are assignable that are usable in equipment Q, if the apparatus R is usable only for the equipment Q and the apparatus S is generally usable not only for the equipment Q, the apparatus R is preferentially assigned to the equipment Q. This enhances the likelihood that the apparatus S is assigned to other equipment or another job. When the priority is thus set based on the generality of application, namely, in such manner that, for example, the more the specialty of the apparatus to be assigned to the equipment, the higher the priority is set to that apparatus, it becomes possible to efficiently assign the resources.

In FIG. 21B, there is shown an example of a priority-related portion of the resource data in which priorities are set to objective resources that are usable for, or in combination with, each of other resources. In this example, for one resource, other resources that are usable with that resource at the same time are registered, and the priorities for assignment that are determined for said other resources, are registered. In the case where the priorities of the other resources do not change for said one resource regardless of the types of scenario and job, the priorities may be registered in a form without specifying the scenario and the job name, as shown in the example in FIG. 21B. This makes it possible to achieve reduction in registering work, as well as to achieve improvement in workability of installation work and to perform more proper assignment.

In FIG. 21C, there is shown an example of a priority-related portion of the resource data in which priorities of respective resources are set for each resource type. In this example, for a common resource type, the priorities for assignment that are determined for the multi-purpose usable resources are registered. The example in FIG. 21C shows that, for any type of job or any type of apparatus, not a general-purpose ordinary-performance hose R5, but a general-purpose high-performance hose R4 will be preferentially assigned. In this manner, when each priority of the resource can be determined regardless of: the types of scenario and job; a target resource for which the resource is used; and a resource to be used in combination, the respective priorities of the resources for each resource type can be registered in a form without specifying the scenario, the job name, the target resource and the resource to be used in combination, as shown in the example in FIG. 21C. This makes it possible to achieve reduction in registering work, as well as to achieve improvement in workability of installation work and to perform more proper assignment.

As described above, in accordance with the plant operation support system 550 according to Embodiment 5 of the invention, the control unit 116 of the plant operation support-system server 55 causes each of the current-situation management determination unit 121 and the predictive management determination unit 122, to compare with each other the priorities of plural assignable resources, followed by performing resource assignment preferentially from the resource having a highest priority. Thus, even in the situation where the resources of the same type are stored in plural storage locations, it is possible to perform resource assignment according to the priorities, so that the operability of the plant can be improved.

When the priorities of resources for assignment are predetermined in a manner set in the scenario data or the resource data, it becomes possible to perform resource assignment and assignability determination while giving preference to the resource having a higher priority for assignment.

Embodiment 6

Although in Embodiment 1, for each of the jobs, one corresponding resource assignment is executed, there are cases depending on circumstances where a resource is distributed to plural points so as to have plural placement locations. In Embodiment 6, the resource assignment is executed according to the priorities of the placement locations.

In a plant operation support-system server 56 that is a main part of a plant operation support system 560 according to Embodiment 6 of the invention, each of the current-situation management determination unit 121 and the predictive management determination unit 122 compares with each other the priorities of plural placement locations of the resource to be subjected to execution, followed by performing resource assignment preferentially from the resource whose placement location has a highest priority. The other configuration of the plant operation support-system server 56 is the same as in the plant operation support-system server 51 of Embodiment 1, so that the same reference numerals are given to their corresponding parts and description thereof is omitted here.

Next, operations of the plant operation support-system server 56 in the plant operation support system 560 according to Embodiment 6 of the invention will be described. A flowchart that shows how the plant operation support system 560 according to Embodiment 6 makes a current-situation management and a flowchart that shows how the system makes a future prediction are similar to in FIG. 19 and FIG. 20, respectively.

With respect to the current-situation management, as shown in FIG. 19, such operations are firstly carried out that are similar to in the flow from Step S701 to Step S706 shown in FIG. 7 in Embodiment 1. Subsequently, the control unit 116 of the plant operation support-system server 56 causes the current-situation management determination unit 121 to compare with each other the priorities of plural placement locations of the resource to be subjected to execution (Step S1901), and then to perform resource assignment preferentially from the resource whose placement location has a highest priority (Step S1902). Thereafter, the flow moves to the step of determining assignability (moves to Step S708).

The future prediction is carried out in parallel with the above current-situation management, and as shown in FIG. 20, such operations are firstly carried out that are similar to in the flow from Step S801 to Step S803 shown in FIG. 8, when "Yes" is given at the stage corresponding to Step S704 in FIG. 7 shown in Embodiment 1. Subsequently, the control unit 116 causes the predictive management determination unit 122 to compare with each other the priorities of plural placement locations of the resource to be subjected to execution (Step S2001), and then to perform resource assignment preferentially from the resource whose placement location has a highest priority (Step S2002). Thereafter, the flow moves to the step of determining assignability (moves to Step S805).

In FIG. 22, there is shown an example of resource data in which the priorities of the placement locations are set. In this example, each status of assignment is also recorded. With respect a resource name (for example, a fuel F), when its placement locations are inputted into the resource data, the priorities of that locations are registered. It suffices to determine the priorities in ascending order of distances of the placement locations from a location where the resource is used. The determined priorities are inputted when the fuel F is registered in the resource data. For example, the top priority (Priority 1) is given when the resource is in a condition where it is just in use or it can be immediately used (for example, assuming that the resource is the fuel F, when it is held in a tank in the apparatus); the second priority (Priority 2) is given when the resource is located near a device to be used but some kind of work (drawing-in work, connection work, etc.) is required for placing the resource into a usable condition; the third priority (Priority 3) is given when the resource is in a condition where it is placed in the plant yard and can surely be supplied in a short time though its transport is necessary; and the fourth priority (Priority 4) is given when the resource is placed outside the plant yard and requires a certain period of time to be supplied to an assignment destination target. The resource is assigned in order from Priority 1. Note that, when the placement location of the fuel F is changed (for example, when the fuel has been drawn in the tank in an apparatus E from the inside of a building of facility #1), the resource data is updated. When a currently-usable amount (remaining amount) is updated based on the plant data or the like, such updating is reflected in the currently-usable amount (remaining amount) of the resource corresponding to the placement location, in the table in FIG. 22. Further, in such a case where the fuel is drawn in an apparatus, the usable time of the apparatus is updated so that it becomes longer accordingly.

It is noted that, in the case where the fuel has been, for example, drawn in the apparatus and the usable time of the apparatus is updated so that it becomes longer accordingly, when this usable time is not restricted by other than the fuel (namely, when the usable time of one apparatus is determined by another resource that is usable in and assigned to said one apparatus), it is also allowable not to perform recording/updating of the resource data with respect to the fuel F in the tank in each apparatus, by managing the usable time of each apparatus instead of the fuel.

With respect not only to consumable items, such as the fuel but also to apparatuses and the like whose usable times are to be managed, it is possible to perform management of these resources with their placement locations (or locations where they are used) similarly to the above (see, FIG. 23).

As described above, in accordance with the plant operation support system 560 according to Embodiment 6 of the invention, the control unit 116 of the plant operation support-system server 56 causes each of the current-situation management determination unit 121 and the predictive management determination unit 122, to compare with each other the priorities of plural placement locations of the resource to be subjected to execution, followed by performing resource assignment preferentially from the resource whose placement location has a highest priority. Thus, even in the situation where the resources of the same type are stored in plural placement locations, it is possible to perform resource assignment according to the priorities of the placement locations, so that the operability of the plant can be improved.

It is noted that some items of resources are normally not transported from their placement locations each having a high priority to other locations (other apparatuses or placement locations each having a lower priority). For example, there is a case for a fuel where, when it is once drawn in a tank in an apparatus (with a placement location having a high priority), it is not transported to another apparatus or a placement location having a lower priority. Even in such a case, however, by referring to the data about the priorities of the placement locations for each item of resource, it is possible in Step S1902 and Step S2002 to determine resource assignability to the other apparatus or the like.

In this manner, when the placement locations of the resource are set in the resource data and a rule is determined about the priorities of the placement locations (placement location priorities) for resource assignment, it becomes possible to assign the resource and determine resource assignability, while specifying the placement location. This makes it possible not only to understand deficiency/excessiveness of a specific type of resource with respect to a job step, but also to easily understand the transport/supply plan of resources, namely, which type of resource has to be transported to which placement location and at what timing. Thus, it is possible to prevent interruption of supply of a resource to the apparatus using the resource (for example, to prevent the fuel for the apparatus from running out).

FIG. 24 shows a display example by the display control unit 111 according to Embodiment 6, in which, for each type of resource, a current resource situation and an estimated resource situation at the completion of following each job are displayed. One or more priorities of the storage locations may be specified in order to display resources in these locations. For example, in the upper table in FIG. 24, the reserved situation and the usage plan for each of the assigned resources with the placement location priorities of 1 to 3 are indicated. Further, the placement location priority of the assigned resource may be indicated by a numeral or symbol (see, the row of the fuel F in the lower table in FIG. 24 [noted by a numeral in brackets]).

FIG. 25 shows another display example by the display control unit 111 according to Embodiment 6, in which, for each type of resource, a current resource situation and an estimated resource situation at the completion of following each job are indicated as a bar graph form. When the placement locations of the assigned resource are indicated by different colors according to the placement location priorities, it is possible to easily understand the timing where resource transport is required. For example, it makes it easy to understand the timing, when the different colors are used so that the lower the priority becomes the higher the alarming degree, in such a manner that green is applied to Priority 1, yellow is applied to Priority 2, orange is applied to Priority 3 and red is applied to a required amount of the resource not yet assigned. Note that, when the resources of the same type (here, the fuel F) are indicated as they are classified by their assignment destination targets, as shown in the rows of No. 3-2, No. 4-2 and No. 5-2 in the lower table in FIG. 25, it is possible to easily understand the refueling timing at each of the assignment destination targets (here, the apparatuses C, D and E).

Embodiment 7

In Embodiment 1, the sensors 1 and the plant operation support-system server 51 are connected with each other by way of a bidirectional communication line through the plant network 2; however, in Embodiment 7, a case will be shown where a communication line having a data diode or the like, that allows communication in one direction only, is used between the sensors and the plant operation support-system server.

Figure 26:
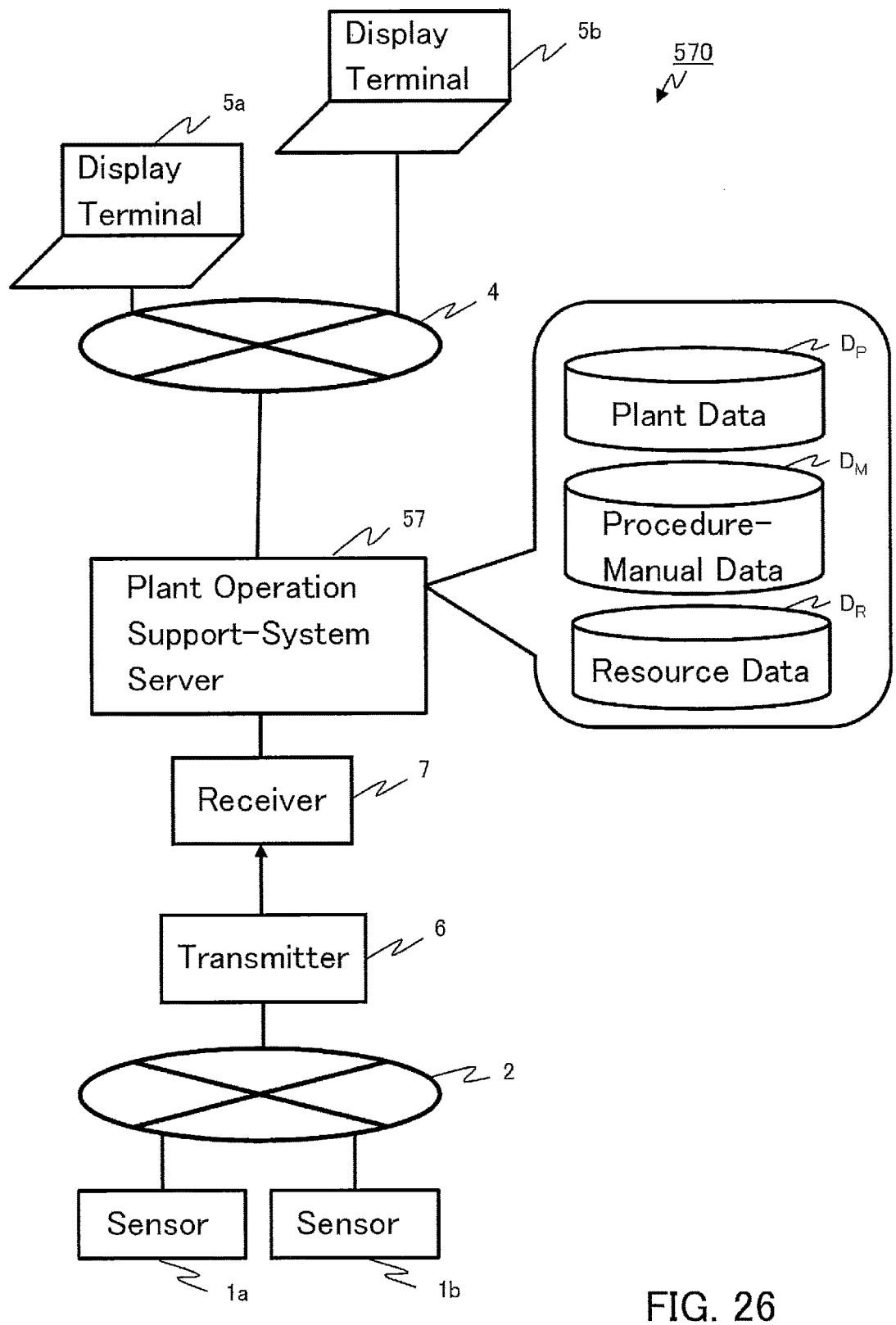
FIG. 26 is an overall configuration diagram of a plant operation support system according to Embodiment 7 of the invention.

FIG. 26 is an overall configuration diagram of a plant operation support system 570 according to Embodiment 7 of the invention. As shown in FIG. 26, the plant operation support system 570 includes a transmitter 6 and a receiver 7 for communicating data in one direction only, between the plant network 2 to which the plural sensors 1 are connected and a plant operation support-system server 57. It is possible to communicate data in one direction only in such a manner that an optical cable is installed which allows transmission of signals in one direction only from the transmitter to the receiver. The other configuration of the plant operation support system 570 is the same as in the plant operation support system 510 of Embodiment 1, so that the same reference numerals are given to their corresponding parts and description thereof is omitted here.

As described above, in accordance with the plant operation support system 570 according to Embodiment 7 of the invention, the transmitter 6 and the receiver 7 for communicating data in one direction only from the transmitter to the receiver are provided between the sensors 1 and the plant operation support-system server 57. Thus, if a trouble (failure, etc.) occurs in the plant operation support-system server, the trouble has no effect on the plant network (the plant control is not affected).

Embodiment 8

In Embodiment 7, a case has been shown where the communication line having a data diode or the like, that allows communication in one direction only, is used between the sensors and the plant operation support-system server; however, in Embodiment 8, a case will be shown where a communication line having a data diode or the like, that allows communication in one direction only, is used between the display control unit serving as a monitoring device and the plant operation support-system server.

Figure 27:
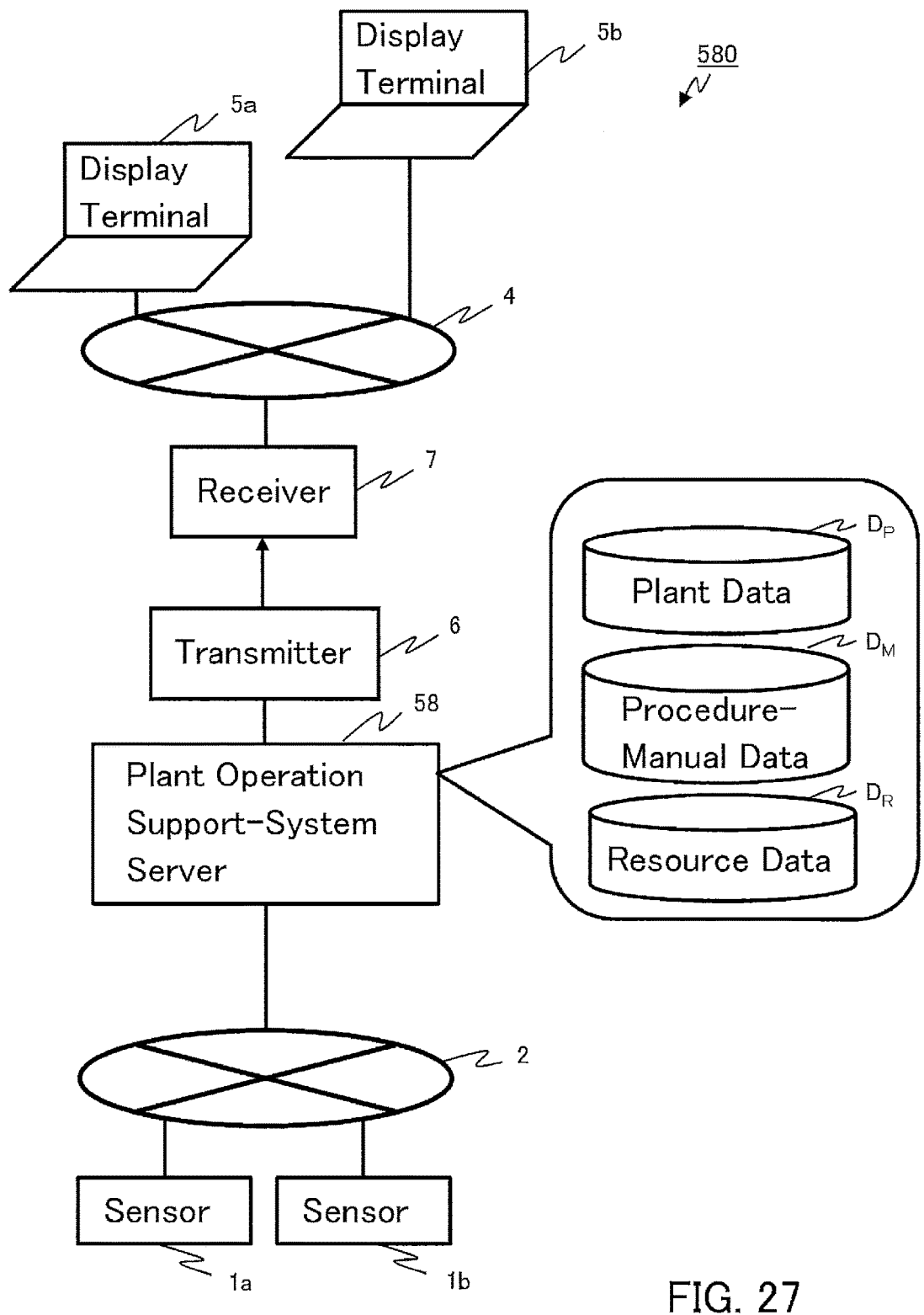
FIG. 27 is an overall configuration diagram of a plant operation support system according to Embodiment 8 of the invention.

FIG. 27 is an overall configuration diagram of a plant operation support system 580 according to Embodiment 8 of the invention. As shown in FIG. 27, the plant operation support system 580 includes the transmitter 6 and the receiver 7 for communicating data in one direction only, between the system network 4 to which the plural display terminals 5a, 5b are connected and a plant operation support-system server 58. It is possible to communicate data in one direction only in such a manner that an optical cable is installed which allows transmission of signals in one direction only from the transmitter to the receiver. The other configuration of the plant operation support system 580 is the same as in the plant operation support system 510 of Embodiment 1, so that the same reference numerals are given to their corresponding parts and description thereof is omitted here.

As described above, in accordance with the plant operation support system 580 according to Embodiment 8 of the invention, the transmitter 6 and the receiver 7 for communicating data in one direction only are provided between the display terminals 5 and the plant operation support-system server 58. Thus, if a trouble occurs in the display terminal (terminal hijacking, etc. through Internet), the trouble has no effect on the plant operation support system.

It should be noted that unlimited combination of the respective embodiments, and any appropriate modification or omission in the embodiments may be made in the present invention without departing from the scope of the invention.

What is claimed is:

1. A plant operation support-system server, comprising:
a plant data acquisition unit that acquires a condition of a plant;
a procedure-manual data storage unit in which procedure-manual data is stored;
a resource data storage unit in which resource data is stored;
a current procedure-manual location determination unit that determines, from the procedure-manual data stored in the procedure-manual data storage unit, a current location in the procedure-manual data, according to the condition of the plant acquired by the plant data acquisition unit;
a predictive procedure-manual location determination unit that predicts a job content that is expected to be executed next, from the procedure-manual data stored in the procedure-manual data storage unit and from the current location in the procedure-manual data determined by the current procedure-manual location determination unit;
a required-resource determination unit that determines currently-required resources from the resource data stored in the resource data storage unit;
a predictive required-resource determination unit that determines next-required resources, from the job content expected to be executed next that is predicted by the predictive procedure-manual location determination unit;
a current-situation management determination unit that assigns to the plant, the currently-required resources determined by the required-resource determination unit;
a predictive management determination unit that attempts to assign the next-required resources determined by the predictive required-resource determination unit, to thereby predict presence/absence of resource deficiency;
a control unit that causes the current-situation management determination unit to assign the currently-required resources and causes the predictive management determination unit to predict the presence/absence of resource deficiency, according to the current location in the procedure-manual data determined by the current procedure-manual location determination unit on the basis of the condition of the plant acquired by the plant data acquisition unit; and
a display control unit that displays an application situation of the currently-required resources assigned by the current-situation management determination unit, and a situation about the presence/absence of resource deficiency predicted by the predictive management determination unit, where the situation about the presence/absence of resource deficiency includes an item or graph displayed with a warning for each next-required resource that has a predicted presence/absence of resource deficiency.

2. The plant operation support-system server according to claim 1, wherein the current-situation management determination unit and the predictive management determination unit assign the currently-required and next-required resources, respectively, based on a priority set to each of the resources.

3. The plant operation support-system server according to claim 2, wherein the priority set to each of the resources is that which has been set according to a type of resource, a storage location of resource or a type of the storage location of resource.

4. The plant operation support-system server according to claim 1, wherein each of the current-situation management determination unit and the predictive management determination unit, when multiple corresponding jobs are to be performed, assigns the resources according to priorities of the multiple corresponding jobs.

5. The plant operation support-system server according to claim 1, wherein the current-situation management determination unit, when a flow of procedures returns back because a resource became unusable, precludes the resource from the resource data.

6. The plant operation support-system server according to claim 1, wherein each of the current-situation management determination unit and the predictive management determination unit assigns the resource, based on a predicted resource usable amount preset in the procedure-manual data.

7. The plant operation support-system server according to claim 1, wherein the predictive management determination unit, when the number of resources decreases drastically after assignment, causes the display control unit to display a screen for calling a user's attention.

8. The plant operation support-system server according to claim 1, wherein the display control unit displays a resource time management, using a graph.

9. The plant operation support-system server according to claim 1, wherein the display control unit displays a resource time management in which assignability is shown for every group of resources.

10. The plant operation support-system server according to claim 9, wherein the group of resources is a group based on: a priority set for each resource: a type of the resource; a storage location of the resource; or a type of the storage location of the resource.

11. A plant operation support system, comprising:
the plant operation support-system server according to claim 1;
a sensor that detects the condition of the plant; and
a display terminal that performs displaying on a screen under control of the display control unit.

12. The plant operation support system according to claim 11, wherein a transmitter and a receiver for communicating data in one direction only, are provided between the sensor and the plant operation support-system server.

13. The plant operation support system according to claim 11, wherein a transmitter and a receiver for communicating data in one direction only, are provided between the display terminal and the plant operation support-system server.

14. The plant operation support system according to claim 11, wherein respective transmitters and receivers for communicating data in one direction only, are provided between the sensor and the plant operation support-system server and between the display terminal and the plant operation support-system server.

* * * * *